United States Patent
Kohn-Rich

(10) Patent No.: US 9,524,647 B2
(45) Date of Patent: Dec. 20, 2016

(54) AUTONOMOUS NAP-OF-THE-EARTH (ANOE) FLIGHT PATH PLANNING FOR MANNED AND UNMANNED ROTORCRAFT

(71) Applicant: The Aerospace Corporation, El Segundo, CA (US)

(72) Inventor: Sylvia Kohn-Rich, Manhattan Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 2 days.

(21) Appl. No.: 14/599,574

(22) Filed: Jan. 19, 2015

(65) Prior Publication Data
US 2016/0210863 A1    Jul. 21, 2016

(51) Int. Cl.
G08G 5/00     (2006.01)
G05D 1/04     (2006.01)
G05D 1/08     (2006.01)
G05D 1/10     (2006.01)

(52) U.S. Cl.
CPC ............ *G08G 5/0034* (2013.01); *G05D 1/042* (2013.01); *G05D 1/0808* (2013.01); *G05D 1/102* (2013.01); *G08G 5/0047* (2013.01)

(58) Field of Classification Search
None
See application file for complete search history.

(56) References Cited

U.S. PATENT DOCUMENTS

| 2003/0030582 A1* | 2/2003 | Vickers | G01S 17/023 342/54 |
| 2006/0184294 A1* | 8/2006 | Ma | G01C 23/00 701/25 |

OTHER PUBLICATIONS

John F. Gilmore et al., "Knowledge-based approach toward developing an autonomous helicopter system", Optical Engineering, 25(3):415-427, Mar. 1986.
Adriana Lee, "Parrot's New Drone + Oculus Rift = The Virtual Reality of Flight," http://readwrite.com/2014/05/12/parrot-bebop-drone-oculus-rift-virtual-reality-quadcopter (May 12, 2014).
Bir Bhanu et al., "A system for obstacle detection during rotorcraft low altitude flight", IEEE Transactions on Aerospace and Electronic Systems, 32(3):875-897, Jul. 1996.

(Continued)

*Primary Examiner* — Mussa A Shaawat
*Assistant Examiner* — Kyung Kim
(74) *Attorney, Agent, or Firm* — LeonardPatel, PC

(57) ABSTRACT

A flight path planning approach may be deterministic and guarantee a safe, quasi-optimal path. A plurality of three-dimensional voxels may be determined as cells of a rectangular grid. The cells may have a predetermined length and width. A shortest safe path through the grid graph may be calculated from a local start to a local goal defined as points on a nominal global path. Geometric smoothing may be performed on the basis line from the local start to the local goal to generate a smooth three-dimensional trajectory that can be followed by a given rotorcraft. Dynamic smoothing may be performed on the three-dimensional trajectory to provide a maximum possible speed profile over a path defined by the dynamic smoothing. The three dimensional path information may be provided to an autopilot, which may then control the rotorcraft to fly along the defined path.

40 Claims, 22 Drawing Sheets

(56) References Cited

OTHER PUBLICATIONS

Herb Male et al., "An advanced flight path management system for low altitude helicopter flight", Proceedings of the IEEE/AIAA 10th Digital Avionics Systems Conference, 510-515, Oct. 1991.

David M. Keirsey et al., "Multilevel path planning for autonomous vehicles", Proc. SPIE—Int. Soc. Opt. Eng., USAJ, 485, 133-137, 1984.

F. S. Huade Li et al., "Introduction and solutions to noe path planning with incomplete information", Proceedings of 1993 IEEE Region 10 Conference on Computer, Communication, Control and Power Engineering (TENCON '93), 4, 518-521,Oct. 1993.

Federal Aviation Administration Modernization and Reform Act of 2012. Public Law 112-95-Feb. 14, 2012. 112th Congress. 126 Stat 73-75, Sec. 332. "Integration of Civil Unmanned Aircraft Systems into National Airspace System".

G. D. Padfield, "Helicopter Flight Dynamics: The Theory and Application of Flying Qualities and Simulation Modeling", AIAA Education Series, 1996 (part A).

G. D. Padfield, "Helicopter Flight Dynamics: The Theory and Application of Flying Qualities and Simulation Modeling", AIAA Education Series, 1996 (part B).

Graham Warwick Washington, "Looking Ahead: Wider industry need for collision avoidance prompts Aurora to spin off new venture," Aviation Week & Space Technology (Dec. 15/22, 2014).

J. F. Gilmore, "Automatic route planning in autonomous vehicles", IEEE Seventh International Conference on Pattern Recognition, 2, 880-882, Jul.-Aug. 1984.

J. F. Gilmore, "The autonomous helicopter system", Proc. SPIE—Int. Soc. Opt. Eng (USA), 485, 146-152, 1984.

J. Gilmore, "Planning in an autonomous system environment", Ninth International Workshop—Expert Systems and their Applications, Specialized Conference, Artificial Intelligence and Defense, 303-312,1989.

Joseph S. B. Mitchell, "An algorithmic approach to some problems in terrain navigation", Geometric Reasoning, Massachusetts Institute of Technology Press, 171-201, 1989.

M. G. D.J. Allerton, "Oct-tree terrain modelling methods for terrain reference navigation systems", Aeronautical Journal, 100 (995):157-164, May 1996.

Herb Male, Mark Robinson, and Martin Kushner, "An integrated onboard route planner for helicopter applications", Proceedings of the IEEE/AIAA 11th Digital Avionics Systems Conference,193-198, Oct. 1992.

Office of Inspector General Audit Report AV-2014-061 issued Jun. 26, 2014, U.S. Department of Transportation, Federal Aviation Administration, "FAA Faces Significant Barriers to Safely Integrate Unmanned Aircraft Systems Into The National Airspace System", pp. 1-7, 24, 26.

P. K. A. Menon et al., "Helicopter trajectory planning using optimal control theory", American Autom. Control Council Proceedings of the 1988 American Control Conference, 2, 1440-1446, 1988.

P. K. A. Menon et al., "Optimal trajectory synthesis for terrain following flight", Journal of Guidance, Control and Dynamics,14(4):807-813, Jul.-Aug. 1991.

R. F. Lewis, "Evaluation of an automatic navigation system for use in helicopters", Proceedings of the IEEE International Symposium on Man-Machine Systems, Sep. 1969.

R. T. Antony, "A hybrid spatial/object-oriented database management system to support automated spatial, hierarchical and temporal reasoning", Advances in Spatial Reasoning, pp. 63-132, Ablex Pub. Corp., 1990.

Richard V. Denton et al., "Applications of artificial intelligence in automated route planning", Proc. SPIE—Int. Soc—Opt. Eng. (USA), 485, 126-132, 1984.

Richard V. Denton et al., "Guidance automation for nap-of-the-earth flight", Proceedings of the IEEE/AIAA 7th Digital Avionics Systems Conference, 261-266, 1986.

U.S. Department of Transportation, Federal Aviation Administration."Integration of Civil Unmanned Aircraft Systems (UAS) in the National Airspace System (NAS) Roadmap", pp. 16-19, 28-30, 36-37, 39-40, 43, 53-54, 60, 67, 69, First Edition—2013.

U.S. Department of Transportation, Research and Innovative Technology Administration, John A. Volpe National Transportation Systems Center, Technical Report DOT-VNTSC-DoD-13-01, Version 0.1—Sep. 2013, "Unmanned Aircraft System (UAS) Service Demand 2015-20135", pp. 53-54.

Velodyne LiDAR Puck Brochure, http://velodyne.com/lidar/web/pdf/doc/VLP-16.pdf (last accessed Jan. 19, 2015).

Victor H. L. Cheng et al., "Automatic guidance and control for helicopter obstacle avoidance", Journal of Guidance, Control and Dynamics, 17(6):1252-1259, Nov.-Dec. 1994.

Victor H. L. Cheng et al., "Technologies for automating rotocraft nap-of-the-earth flight", Journal of the American Helicopter Society, 38(2):78-87, Apr. 1993.

W. Johnson, "Helicopter Theory", Dover Publications Inc., 1980.

Y. Ansel Teng et al., "Stealth terrain navigation for multi-vehicle path planning", International Journal of Pattern Recognition and Artificial Intelligence, 6(2 and 3):395-416, Aug. 1992.

\* cited by examiner

AUTONOMOUS NAP-OF-THE-EARTH (ANOE) FLIGHT PATH PLANNING FOR MANNED AND UNMANNED ROTORCRAFT

FIELD

The present invention generally pertains to vehicle flight planning, and more specifically, to path and trajectory planning for manned and unmanned rotorcraft based on sensor information that guarantees safety of the rotorcraft and its surroundings.

BACKGROUND

The lack of adequate "detect and avoid" and "sense and avoid" capabilities has been a significant technological barrier that has limited the progress of the adoption of unmanned aerial systems (UAS) into the National Airspace System (NAS). Because there are no pilots onboard such systems, a UAS cannot comply with the "see and avoid" requirements that underpin operational safety in the NAS. There is currently a lack of a mature UAS technology capable of automatically detecting other aircraft operating in nearby airspace and successfully maneuvering to avoid them.

A rotorcraft, such as a helicopter, may employ different flight paths such as paths 100 illustrated in FIG. 1. In low level flight 110, the rotorcraft flies relatively low to the ground, but flies along a straight path. In contour flight 120, the rotorcraft maintains a relatively constant height above the ground, making adjustments based on terrain contour. In Nap-Of-the-Earth flight 130, the rotorcraft flies very close to the ground, adjusting height to avoid hitting the ground, avoiding obstacles, and potentially using obstacles and terrain folds as cover.

Both civilian and military types of NOE missions may involve flight very close to the ground, requiring avoidance of obstacles such as trees, poles, wires, and buildings. For military missions, using terrain features as masking from enemy sensors may be beneficial. This NOE flight mode maximizes survivability for military missions because most anti-aircraft (AA) weapons require line-of-sight (LOS) contact for some period of time in order to compute a firing solution. For commercial and civilian operations (e.g., medevac, package delivery, firefighting, etc.), it is often necessary to fly NOE in urban or forested areas rich in ground obstacles.

In manned NOE flight, there is little margin for error for the pilot. At an altitude of 6 meters, for example, a helicopter flying at just 40 kilometers per hour can hit the ground in just half a second. The pilot has to navigate to the target while deciding how to avoid obstacles detected at relatively close ranges of less than 1 km. In the presence of ground-based threats, the pilot also has to remain masked from enemy radar by navigating areas protected by terrain folds. For night and/or bad weather operations, the pilot will generally need to wear display goggles or an eyepiece displaying information from external sensors, such as forward-looking infrared (FLIR), etc. These devices have relatively narrow fields of view and inherent time delays on head tracking motions, which may result in motion sickness for rapid head motions. In medevac missions, the pilot will also look for the injured person's location and lower the transport basket or other gear attached to a steel cable, while keeping the cable free of tangles or obstructions. As a consequence, NOE operations impose extremely high workloads on the flight crew, especially the pilot.

Some conventional optimal NOE trajectory planning solutions use a linear combination of flight time and terrain masking as the performance index. The trajectory masking was assumed to be accomplished if an integral proportional to the helicopter altitude above the terrain was minimized. Such solutions required the first and second partial derivatives of the terrain, which could be computed using a cubic polynomial parameterization of the digital terrain map (DTM) elevation data. However, for terrain data obtained in-flight from sensor readings, these derivatives would be very noisy and inexact. The Autonomous Helicopter System (AHS) had a three section knowledge-based architecture: vision, planning, and control. Vision provided the local and global scene analysis that is symbolically represented and passed to planning as the initial route planning constraints. Planning generated a task dependent path for the vehicle to traverse, which assures maximum mission system success as well as safety. Control validated the path and either executed the given route or fed back to previous sections in order to resolve conflicts.

The IBM Advanced Flight Path Management System displayed pilot cues for smooth tracking of the desired flight path. It consisted of an onboard route planner that computed the optimum flight path, minimizing exposure, a covert terrain following function based on an advanced low altitude techniques (ADLAT) terrain following algorithm, a guidance function that determined path errors between the present position and desired flight path, and a flight director function that computed pilot commands for aided manual flight. This approach integrated output from FLIR, multi-mode radar (MMR), a global positioning system (GPS), a high accuracy inertial navigation system (INS), Doppler radar, air data sensors, and an attitude heading reference system (AHRS).

The NOE path planning problem has been divided into "near field" and "far field" problems. Near field is associated with flight in the next several seconds, in the order of tens of seconds at most. Far field refers to a longer time interval. For example, this time interval may be on the order of tens of minutes. The far field solution as embodied in waypoints is determined during mission planning, and is one of the inputs to the NOE calculation. The near field path planning is carried out over a rectangular region divided into cells, and is based on real-time optimization of a performance measure. The NOE planning system of some conventional approaches is divided into far field planning (i.e., generating the global path between waypoints based on terrain, vehicle resources, and threat information using simulated annealing or dynamic programming), mid-field planning (i.e., refining the flight route generated by the far-field planner for a short duration ahead by referring to more detailed terrain information, possible even terrain masking from threats) and near field obstacle avoidance planning (i.e., maneuvering, based on obstacle detection sensor data, around the nominal path generated by the mid-field planner by a two dimensional range map of range as a function of azimuthal look angle).

In NOE mode, the vehicle flies as close to the ground as vegetation and obstacles safely permit, generally following the contours of the terrain, and thus minimizing exposure to potential threats. The terrain through which the vehicle must fly is considered "hostile" in the sense that there are enemy emplacements with LOS-type sensors such as laser and radar, whose positions are not known. Some information on the enemy sensors and weapons characteristics, such as lock-and-launch times, is known a priori. Also, initial information is available concerning some of the locations and movements of these threats, but the threats are expected to move and/or become active or dormant, and the total number of threats is unknown.

Path planning on hostile terrain has been extensively studied for ground and airborne vehicles. Although there are differences between the conventional solutions to this problem, there has essentially been a convergence to two solution methodologies for planning a path between two points on the terrain. One methodology involves the use of digital terrain elevation data (DTED). DTED subdivides the terrain into "terrain cells" by a homogeneous grid in the horizontal plane. Height information is stored and updated by sensor information for each cell. This data is then processed in order to assign some "weight" to each terrain cell, and then some "cost" function is evaluated to find the "cheapest" (i.e., shortest) path by A* or similar graph search algorithms. Alternatively, the DTED database is processed to create a 2-D polygonal obstacle map, and then a graph-like database, or a range map, is generated that can be searched by a heuristic algorithm. The other methodology involves modeling of the terrain by a smoothing function and applying optimal control theory for trajectory planning. This methodology is not practical for in-flight re-planning mainly because the terrain data provided by the sensors is very noisy.

In the DTED approach, the path generation process first generates the footprint of the flight path on the x-y plane, and then generates the vertical flight path along the footprint. This two-stage approach to path generation requires significantly less complex algorithms than other approaches. The horizontal (i.e., lateral) path may be approximated by straight lines that are made as long as possible to eliminate "digitization bias," which is a product of requiring paths to stay on the grid graph. The lines may be connected by tangent arcs that would correspond to coordinated aircraft turns without sideslip. The vertical plane is defined by the s (along the x-y path footprint) and z (absolute height) coordinates. The vertical path may be approximated by lines and arcs in the s-z plane. Normal acceleration in the vertical dimension can be related to an effective "vertical" turn radius.

The terrain profile may be generated along the horizontal path. Its parallel profile at the nominal flight height becomes the basis for vertical smoothing. Since helicopters have more strict limitations in negative accelerations than in vertical accelerations, the vertical path may be designed to minimize sudden dives (i.e., push-down maneuvers), following the terrain just close enough to avoid this issue. Several conventional algorithms have been proposed to eliminate push-downs. These include the branch-and-prune technique, optimal control, constant acceleration parabolas, and commanded altitude rate for present ground speed.

The dynamic constraints of the helicopter may be stored in the system as maximum acceleration versus distance, deceleration (i.e., flare) versus distance, and slope versus speed curves (e.g., lateral, longitudinal and vertical maximum accelerations, pitch and roll limits, and maximum angular rates). These constraints are specific to the helicopter and are determined by flight testing or estimated by simulation. The parameters also vary with weather conditions and height.

Standard approaches to modeling the terrain for the obstacle avoidance problem, where the plane is subdivided into obstacles or nonobstacles, include subdivision of the plane into small regular "pixels," hierarchical subdivision (e.g. quadtree), polygonal description of obstacles, description of obstacles by circles, ellipses, or other non-polygonal objects. The standard approaches may also include description of obstacles by splinegons (i.e., closed curved figures), and decomposition of free space into generalized cylinders. Shortest paths according to Euclidean metrics will be "taut string" paths, like threading a string from start to a goal among obstacles and pulling the string "taut."

The worst-case running time of the shortest path algorithm on a regular grid with n pixels is $O(n \log n)$. However, the path is not the shortest according to the Euclidean metric due to "digitization bias" of the 8-connected grid. For maps given in the form of a list of polygonal obstacles, the shortest path can be found by building a visibility graph of the obstacle space or by building a shortest path map. The computational bottleneck is in the construction of the graph, requiring time $O(n^2)$ for most graphs and $O(n \log n)$ for sparse graphs. The nodes of the visibility graph are the vertices of the obstacles and the edges do not cross the interior of any obstacle. The graph can be searched using A* or Dijkstra's algorithm. The shortest path map is a subdivision of the plane into regions that are loci of all goal points whose shortest paths to start pass through the same sequence of obstacle vertices. A shortest path is found by location of the goal point in its subdivision, done in time $O(n \log n)$ and then backtracking an optimal path (i.e., the "continuous Dijkstra" algorithm). In conclusion, the best terrain model for the NOE in-flight path planning problem is a regular grid, since the height information on each "pixel" (i.e., terrain cell) changes according to real-time sensor data. The problem of "digitization bias" is alleviated by path smoothing.

The problem of finding the shortest path for a vehicle constrained on a non-planar surface is the geodesic problem. In this case, the representation of the surface is in three dimensions: (1) polyhedral—given by faces, edges, and vertices with their corresponding adjacency relationships; (2) contour lines—similar to geological terrain maps, given by iso-elevation curves; and (3) elevation array—a two-dimensional array of numbers representing the altitude at each grid point. Digital terrain databases of the form compiled by the Defense Mapping Agency (also called Digital Terrain Maps (DTMs)) fall into this category.

The solution for a map given by elevation array is analogous to the planar case. For the polyhedral representation, however, the general problem is proved to be NP-hard. For convex polyhedra, the shortest path problem can be solved with complexity $O(n^2 \log n)$ using shortest path maps.

It is assumed that the map of the terrain represents a set of regions in the plane, each having an associated weight or cost c. This weight specifies the "cost per unit distance" of a vehicle traveling in that region. The objective is to find a path from start to goal in the plane that minimizes total cost according to this weighted Euclidean metric. This weighted region problem is a generalization of the obstacle avoidance problem where the weight for "free space" is 1 and for an "obstacle" is $+\infty$. In military applications, there might be regions exposed to threats having an associated LOS where traveling incurs high costs associated with the danger.

There are two basic types of map representations: regular tessellations (e.g., grids of pixels, or quadtrees) and straight line planar subdivisions. The regular grid of pixels representation is frequently used for terrain data. A set of arrays is provided, each array storing information about some particular aspect (ground cover, land usage, hydrography data, man-made features, and traversability indices). DMA data pixels are usually squares 5, 12.5, or 100 meters on a side. If the terrain map is given as a grid of weighted pixels, the previously presented solution for digitized obstacle maps applies. However, this approach has two main problems: (1) fine grids are needed for good feature representation, which requires a large amount of memory; and (2) digitization bias is caused by confining movements to 8 orientations. Grid graphs of multiple resolution and a hierarchical algorithm can be used to alleviate these problems.

A proposed Spatial Database Management System (SDBMS) consisting of a fully integrated, object-oriented and multiple resolution true spatial representation was shown to significantly enhance problem solving efficiency in information fusion, target recognition, situation assessment, autonomous vehicle control, and planning systems. The hybrid representation consists of: (1) pyramidal multiple resolution, object-oriented spatial representation; (2) region quadtrees; and (3) an object-oriented database. In the pyramidal multiple resolution, object-oriented spatial representation, each pyramid cell is an object that includes a concise semantic description of a particular geographic region.

Region quadtrees are regular, recursive decompositions of Euclidean space into equal-sized quadrants, down to a minimum application-dependent resolution. The nodes are object-oriented representations of spatial regions and the arcs define the geographic decomposition. General properties of features are inherited from below. Nearly all quadtree-related algorithms require only integer arithmetic, and many can be implemented using a simple table lookup. In case of terrain without overhangs, linear oct-trees, where a 2n*2n*2n array is subdivided into octants, can be used for storage of three-dimensional objects. The storage overhead for pointers is overcome by encoding the level of subdivision within each node. This method is used to represent non-layered terrain without overhangs. Grid points within a fixed band of elevation can be aggregated to a single block according to their planar position (i.e., a "terrain oct-tree"). There are two major advantages of the use of terrain oct-trees: (1) transformations between terrain coordinates and the address of the corresponding node in the oct-tree are straightforward; and (2) the redundant nodes below the surface can be discarded, significantly reducing the size of the oct-tree. This can be accomplished by projection of the terrain surface.

The object-oriented database includes point features, such as bridges, road intersections, and buildings, within a maximum resolution pyramid cell having a straightforward mapping to the semantic object representation. For the inverse mapping, the semantic object frame points to the appropriate minimum resolution pyramid node(s). Within a maximum resolution pyramid node, each line feature is represented as an object whose attributes are the vertices of a piecewise linear function stored in a quadtree node-offset form. For lines and regions, the relationship between the spatial and object-oriented representations are not 1:1. An explicit pointer links the line segment to the specific semantic object. The inverse link points to the one or more pyramid nodes that contain the line feature. The pyramid provides a hierarchical spatial indexing scheme to generate generic regions, where pyramid nodes up to and including the minimum enclosing quadtree block point directly to the semantic object representation.

The proposed SDBMS may be highly distributed, run by multiple processors, relaxing the execution speed and memory requirements for each individual processor. The regions are simple polygons if the map is modeled as a straight line planar subdivision. This polygonal terrain approach requires significantly less storage capacity than the regular grids. One approach to the solution of the weighted region problem is to subdivide the terrain into regions, place a node at the centroid of each region, connect the nodes of adjacent regions with arcs (weighted by their length) and search this graph for shortest paths. However, this approach produces paths that are far from optimal.

Another approach uses the continuous Dijkstra paradigm and has a complexity of $O(n^7 L)$, where L is the number of bits needed to represent the problem data, and $\epsilon$-optimal paths are computed, which are longer than the optimal paths by $\epsilon$ percent. This approach assumes straight-line planar subdivision, where each region is a closed polygon with an associated weight per unit length travelled in its midst and different weights per unit length travelled on the edges. The shortest paths generated by this approach are piecewise linear, bending only where they pass through a vertex or cross an edge. The bending angle obeys Snell's Law of Refraction, seeking optimality like light travelling through regions with different indexes of refraction. An optimal path can travel along an edge whose cost is less than its neighboring regions.

Consider the special case in which all the weights on faces and edges are either 0 (travel over them can be done at high speeds), 1 (travel can be accomplished at limited speeds only) or $+\infty$ (blocking obstacles). This applies to the maximum concealment problem, where the regions visible to enemy threats have a finite cost, obstacles have infinite cost and other areas are inexpensive. An obstacle avoiding path between two points is desired, which maximizes the concealment and minimizes exposure. Some special cases can be solved with polynomial-time algorithms.

The least risk watchman route problem is a shortest path problem where all the terrain is required to have had LOS contact with the traveling vehicle at some time, while minimizing the exposure to threats. For the case of rectilinear polygons with n sides, there is an algorithm that solves it with complexity $O(k^2 n^3)$ for k threats. The special case of weights $\{0, 1, +\infty\}$ can be solved in polynomial time by shrinking the zero-cost regions to single nodes, building an "extended visibility graph" and searching for the shortest path using Dijkstra or A*.

The special case of navigation on homogeneous terrain with a network of roads is a weighted region problem where all of the regions have the same cost and the edge costs are different. If the shortest paths are assumed to enter a road segment either at one of the endpoints or by hitting at the critical angle of incidence defined by the ratio of the edge's weight to that of the surrounding terrain, then a discrete "critical graph" can be searched for shortest paths. The critical graph's construction and the search can be done in time $O(n^2)$, where n is the number of road edges. Generalization to the case of multiple-source points yields Voronoi diagrams. Uniform cost per region can be generalized to a cost function, and the boundaries between regions can be allowed to be curved. A good map representation for realistic vehicle navigation should integrate sensor-based information acquired en-route, and the planner should be able to modify the original planned path according to changing conditions.

Prior approaches to ANOE flight planning are expensive and complex, requiring advanced processing and components. This is not practical for many vehicles. Also, prior approaches cannot produce a guaranteed solution. Accordingly, an improved approach to ANOE path planning may be beneficial.

SUMMARY

Certain embodiments of the present invention may be implemented and provide solutions to the problems and needs in the art that have not yet been fully solved by conventional path planning approaches and systems. For example, some embodiments of the present invention guarantee a safe, quasi-optimal path. A shortest safe path through a rectangular grid graph may be calculated from a local start to a local goal defined as points on a nominal global path. Geometric smoothing may be performed on the basis line from the local start to the local goal to generate a smooth three-dimensional trajectory that can be followed by a given rotorcraft. Dynamic smoothing may be performed on the three-dimensional trajectory to provide a maximum possible speed profile over a path defined by the dynamic smoothing.

In one embodiment of the present invention, a computer-implemented method includes determining a-priori, by a computing system, a plurality of three-dimensional voxels as cells of a rectangular grid. The cells have a predetermined length and width. The computer-implemented method also includes calculating, by the computing system, a shortest safe path through the grid graph from a local start to a local goal defined as points on a nominal global path. The computer-implemented method further includes performing, by the computing system, geometric smoothing on a basis line from the local start to the local goal to generate a smooth three-dimensional trajectory that can be followed by a given rotorcraft and performing dynamic smoothing on the three-dimensional trajectory, by the computing system, to provide a maximum possible speed profile over a path defined by the dynamic smoothing Additionally, the computer-implemented method includes providing a nominal path and speed profile, by the computing system, to be used by an autopilot to control the rotorcraft to fly along the defined path.

In another embodiment, a computing system includes memory storing executable computer program code and at least one processor configured to execute the computer program code. The at least one processor is configured to determine a basis line through points at centers of 8-connected cells on a modified Dijkstra shortest path through a grid graph from a start point to an end point. The at least one processor is also configured to determine a polygonal line defining a minimum possible number of straight lines between points on the basis line, the polygonal line connecting the start point and the end point and determine boundary lines parallel to the polygonal line defining a safe corridor. The boundary lines of the corridor are determined by dimensions and clearances for a rotorcraft. The at least one processor is further configured to determine a connecting arc for each change in direction to generate a horizontal path when a direction of a line segment of the polygonal line changes. Additionally, the computing system is configured to provide a horizontal path to an autopilot based on the determinations.

In yet another embodiment, a computer program is embodied on a non-transitory computer-readable medium. The computer program configured to cause at least one processor to analyze a basis profile to determine regions of positive and negative average slopes and eliminate dips that are less than a predetermined distance by filling these dips. The computer program is also configured to cause the at least one processor to approximate a resultant path by straight lines in an s-z plane that do not exceed maximum predetermined slope limitations, do not violate clearance requirements from a terrain profile, and do not deviate more than a predetermined amount from the basis profile without dips. The computer program is further configured to cause the at least one processor to connect the straight lines using arcs having maximum possible radii to minimize vertical accelerations while fulfilling vertical legality requirements to generate a vertical path. Additionally, the computer program is configured to cause the at least one processor to provide the vertical path to an autopilot of a rotorcraft to fly along the generated vertical path safely close to the terrain.

In still another embodiment, a computer-implemented method includes generating, by a computing system, a horizontal and vertical safe path for a rotorcraft. The computer-implemented method also includes determining, by the computing system, maximum speed limits for each arc and line segment of the horizontal and vertical paths. The computer-implemented method further includes generating, by the computing system, a dynamic smoothing profile for the rotorcraft from a starting position to an end position. Additionally, the computer-implemented method includes providing the speed profile, by the computing system, to an autopilot of the rotorcraft to fly at speeds in accordance with the speed profile from the starting position to the end position.

In another embodiment, a computer-implemented method includes determining, by a computing system, a global nominal path and calculating, by the computing system, a running grid with a predetermined size. The running grid includes a square terrain and weights database segment centered around a current position of a rotorcraft based on sensor information. When a portion of the global nominal path that passes through the running grid is not possible to traverse or sub-optimal, the computer-implemented method also includes determining a more optimal path through the running grid and modifying a flight path to include the more optimal path through the running grid. The computer-implemented method further includes providing the global nominal path, by the computing system, to an autopilot to execute flight along the global nominal path.

In yet another embodiment, a computer-implemented method includes determining a plurality of nodes, by a computing system, that are located at centers of terrain cells in a terrain map and calculating, by the computing system, a cost of traversing a straight line arc from each cell center to any of its respective 8-connected neighbors. The computer-implemented method also includes generating, by the computing system, a minimum cost path through the terrain map based on the costs of the straight line arcs as a basis line for a rough flight path footprint for a rotorcraft on an x-y plane.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a path planning approach that is deterministic and guarantees a safe, smoothed, close to optimal path, unlike the conventional approaches discussed above. This approach may be a closed loop autonomous NOE solution that includes: (1) mapping of the environment; (2) optimal NOE trajectory computation; and (3) smoothing of the NOE trajectory. By employing such embodiments, safety of rotorcraft of any size, as well as safety of personnel and objects on the ground, can be guaranteed for beyond line-of-sight (BLOS), regardless of whether the rotorcraft is piloted or unmanned. As used herein, "rotorcraft" refers to any manned or unmanned rotor vehicle, as well as any vehicle capable of NOE flight. Such embodiments are guaranteed to provide a safe flight corridor within the terrain that takes into account aircraft dynamics and physical clearances. Some embodiments may also minimize exposure to threats. In certain embodiments, when sensor or terrain blockage occurs, the approach is guaranteed to ensure flare and hover.

In some embodiments, the path information may be provided to an autopilot of a rotorcraft to implement flight along the path at the determined trajectory and speeds. In certain embodiments, this path information may be used to create a virtual display overlay for a small unmanned rotorcraft having a camera point-of view interface, such as the Parrot Bebop™ with Occulus Rift™. For manned systems, the path information may also be displayed to the pilot and/or copilot via a screen or helmet display to show the path. The autopilot may implement the path, or the pilot may optionally fly the rotorcraft along the path. Such a display may show the path and maximum safe speed to the pilot or controller of the rotorcraft.

Some embodiments also provide for relative simplicity of implementation, integration, and testing. Sequential computations may be performed, and each sequence/stage can be readily isolated and tested. Some embodiments are also deterministic. The solution may be based on relatively less complex and more efficient algorithms compared with conventional approaches. These algorithms may not be dependent on convergence or learning of any system, as is required for neural nets, for example.

Figure 1:
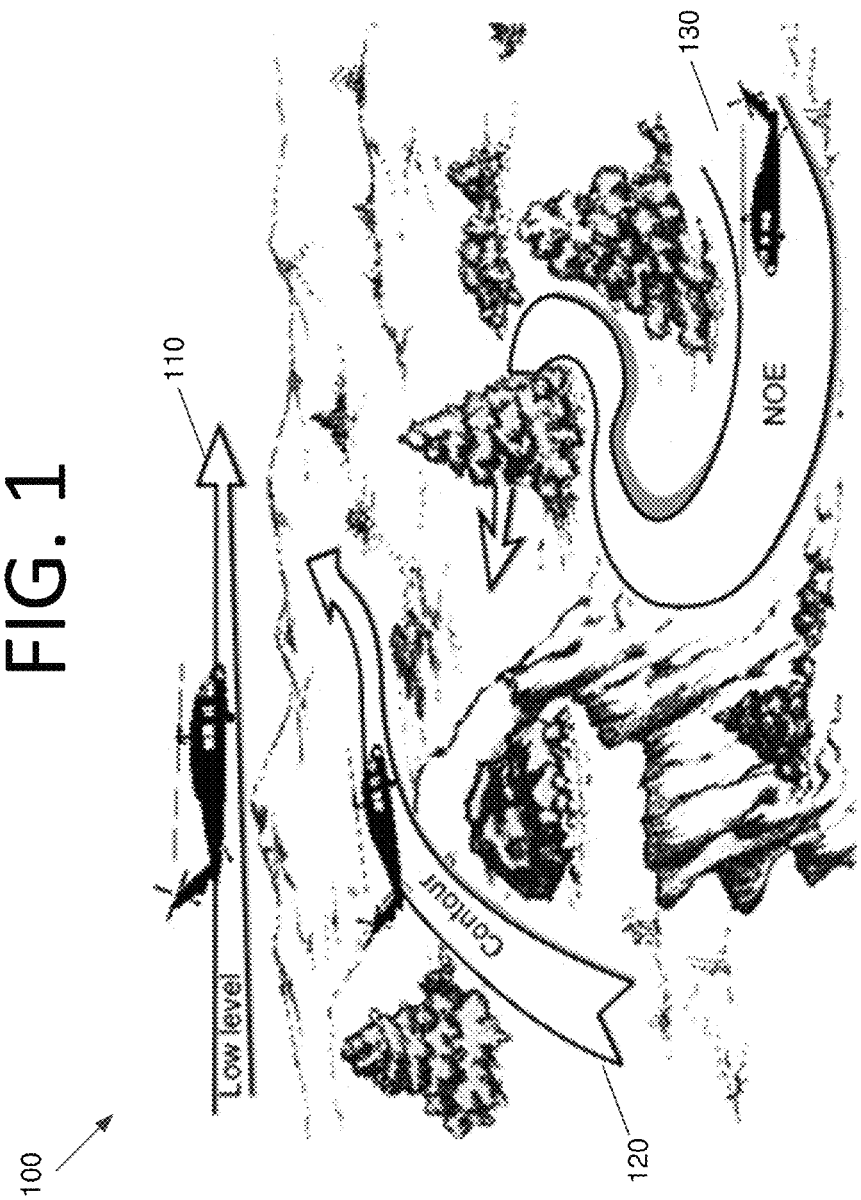
FIG. 1 is a terrain map illustrating three flight path types for a helicopter.
Figure 2:
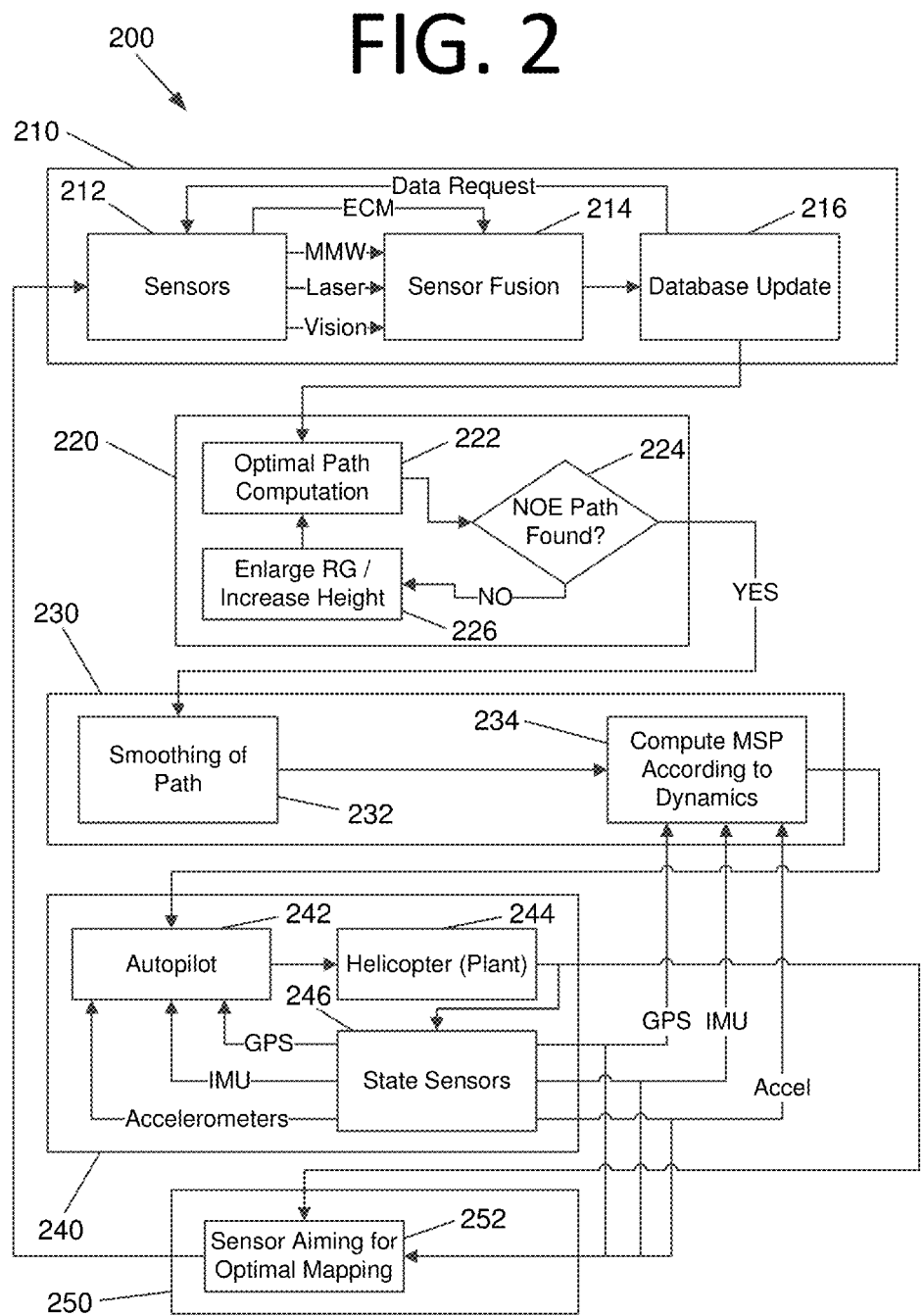
FIG. 2 is an architectural diagram illustrating a closed loop approach to NOE path planning, according to an embodiment of the present invention.

FIG. 2 is an architectural diagram illustrating a closed loop approach to NOE path planning 200, according to an embodiment of the present invention. NOE path planning approach 200 involves sensor mapping of the environment and incorporation into the onboard database to produce a mapping of the environment 210, optimal NOE trajectory computation 220 (performed globally before the mission, within a "running grid" around the rotorcraft while flying), smoothing of the NOE trajectory 230 according to rotorcraft flight characteristics, and rotorcraft platform dynamics, control, and sensing 240, which includes helicopter physical dynamics 244, helicopter state sensors 246 (e.g., GPS, IMU, etc.), and autopilot 242. Sensor aiming logic 250 is provided in order to maximize sensor coverage and mapping over the planned path. Information is shared among the various elements of system 200 in order to provide a complete approach that avoids obstacles and guarantees the optimal path.

Mapping of the environment 210 involves utilizing sensors 212 on the rotorcraft. Sensors 212 in this embodiment gather millimeter wave (MMW), laser, vision, and electronic counter measures (ECM) data for sensor fusion. Sensors 212 also receive sensor aiming information for optimal mapping 252 from sensor aiming logic 250. One excellent fit for such a system for a small UAS implementation would be the Velodyne LIDAR VLP-16. The terrain database in this embodiment stores data on the nodes of a regular grid covering a rectangular portion of terrain aligned North-y and East-x. The terrain database provides a three-dimensional voxel (volumetric element)-based model of the terrain. An example of this database is represented as a vector of structures of the following type D_POINT (each structure representing a terrain grid node or "terrain cell"):

Father Structure:

```
typedef struct
{
  float h;
  short flag;
  struct _son *ptr;
} D_POINT;
Son Structure:
typedef struct _son
{
  float h_low;
  float h_high;
  struct _son *ptr_s;
} SON;
```

The structure of each element in the vector contains the height of the terrain cell (h) in meters and a status flag (flag) that provides a confidence of the height data. If flag=0, information on the respective terrain cell has not yet been updated by sensors. If flag>0, the value indicates the level of confidence regarding the accuracy of the height data, where a higher number indicates a higher confidence.

A pointer to the SON structure (ptr) contains the height bounds of an obstacle "hanging over" the terrain cell, such as a bridge, wire, etc. ptr will be empty (null) for all terrain cells that do not contain hanging obstacles, and ptr will have a non-null value and allocated memory for terrain cells that contain hanging obstacles.

When ptr is allocated, it contains the address of a SON structure that stores the lowest and highest height of the first "layer" (or obstacle) and a null pointer ptr_s to another SON structure. If there are more layers, the pointers will be allocated recursively to structures containing the minimum and maximum heights of these layers. In this way, memory is allocated only when necessary. If sensor data indicates that two layers are actually one, or the gap between them is too small for the rotorcraft to safely fly between them, the upper height bound of the lower layer will be adjusted to the upper height bound of the adjacent layer and the second layer's SON structure will be deallocated, releasing memory and taking care of the chain of subsequent pointers accordingly.

The database may be initialized with the following values for all terrain cells: h=interpolated height according to an available coarse DTM, flag=0, and ptr=NULL. At each computation cycle, the information from the whole sensor suite is merged and incorporated into the terrain database such that no information is lost. The height and confidence values of each scanned terrain cell are updated, and pointer links are merged or built accordingly so that new data does not require extra memory. Therefore, the ANOE system in this embodiment "remembers" obstacles already seen and always finds a safe navigation path. The weights associated with the terrain cells are stored in another vector of same length as the terrain database vector (i.e., a weights database) so that the same index addresses the weight and terrain data of any cell. These weights are used by the optimal path computation algorithm. Each weight is computed as the percentage of cells within a certain radius that have LOS with the given cell. Therefore, higher weight means higher exposure to any potential threat, and usually it corresponds to higher elevation.

The processed sensor information is then stored in a database via a database update 216. The database update is performed periodically as part of the real-time processing loop of closed loop approach to NOE path planning 200.

Optimal NOE trajectory computation 220 includes optimal path computation 222. This involves determining the optimal path through the environment based on known terrain and obstacles. If an NOE path is not found at 224, the running grid is enlarged and/or the height of the rotorcraft is increased at 226 and step 224 is repeated.

If an NOE path is found at 226, smoothing of the NOE trajectory 230 is performed for the path. This involves smoothing the path at 232 and computing the maximum speed profile (MSP) 234 according to vehicle dynamics.

Helicopter model 240 includes various components pertaining to the rotorcraft. Helicopter (plant) 244 is the physical rotorcraft that is being controlled in this embodiment. Autopilot 242 and state sensors 246 are required avionics for the implementation, and many options are commercially available for manned and unmanned rotorcraft. In this embodiment, state sensors 246 include a global positioning system (GPS), inertial measurement unit (IMU), and accelerometers. Autopilot 242 executes the nominal path generated by this embodiment and maintains the rotorcraft position and speed within a small margin of error of this nominal path, as measured by the IMU and GPS. The environment mapping sensors are aimed at the terrain under the pre-planned path in the proximity of the rotorcraft. Sensor aiming logic 250 takes into account the speed and acceleration of the rotorcraft and the geometry of the pre-planned flight path. Sensor aiming logic 250 performs sensor aiming 252 by aiming the vision/laser/radar systems to specific areas within the scanned region that may cover layered terrain cells, obstacles (e.g., sudden rises in height), have insufficient "confidence levels" (i.e., haven't been scanned before or have been scanned only a few times), and lie within the vicinity of the currently planned path. The requirements and algorithms for sensor aiming are tailored for the specifications of the sensors (e.g., field of view, etc).

Figure 3:
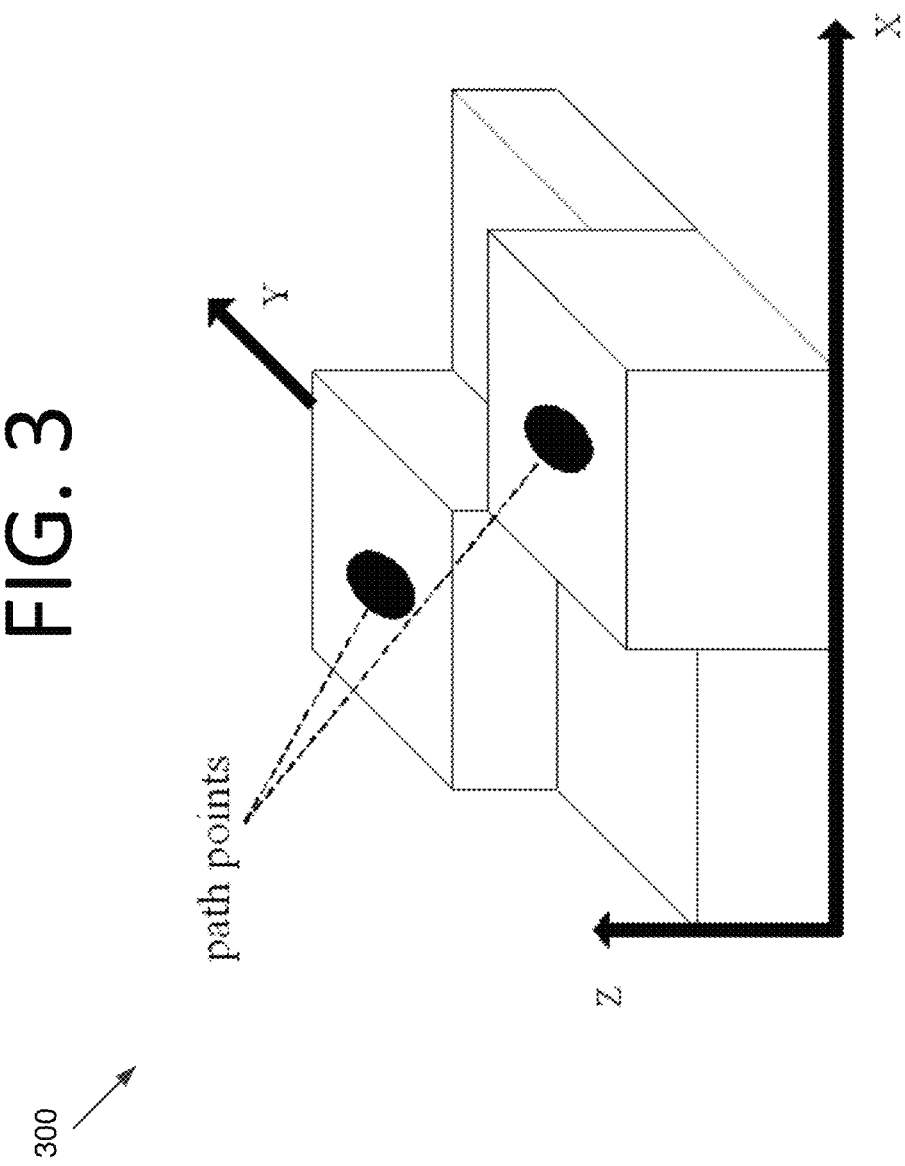
FIG. 3 is a terrain representation illustrating voxels, according to an embodiment of the present invention.

In some embodiments, the terrain database stores data pertaining to the nodes of a regular grid covering a rectangular portion of terrain aligned North (y) and East (x). This may provide a three-dimensional voxel (volumetric element)-based model of the terrain, as can be seen in terrain representation 300 of FIG. 3. The cell size may be chosen to be equal to two rotor diameters, but any desired cell size may be used. However, smaller cell sizes may add overhead into the calculations, particularly the "safety corridor" evaluation, and larger cell sizes are less optimal.

The terrain representation used in some embodiments is a two dimensional array of structures containing altitude information in a similar way to DTMs (i.e., an elevation array type of representation). However, overhang height information is also stored for each grid point in some embodiments, enabling true three-dimensional terrain representation, as well as the weight associated with the grid point. The overhang height information may be recomputed each time the terrain information is updated within a certain range from the grid point. The data received from the sensors may be compressed and stored in the database to decrease the amount of memory that is needed.

Figure 4:
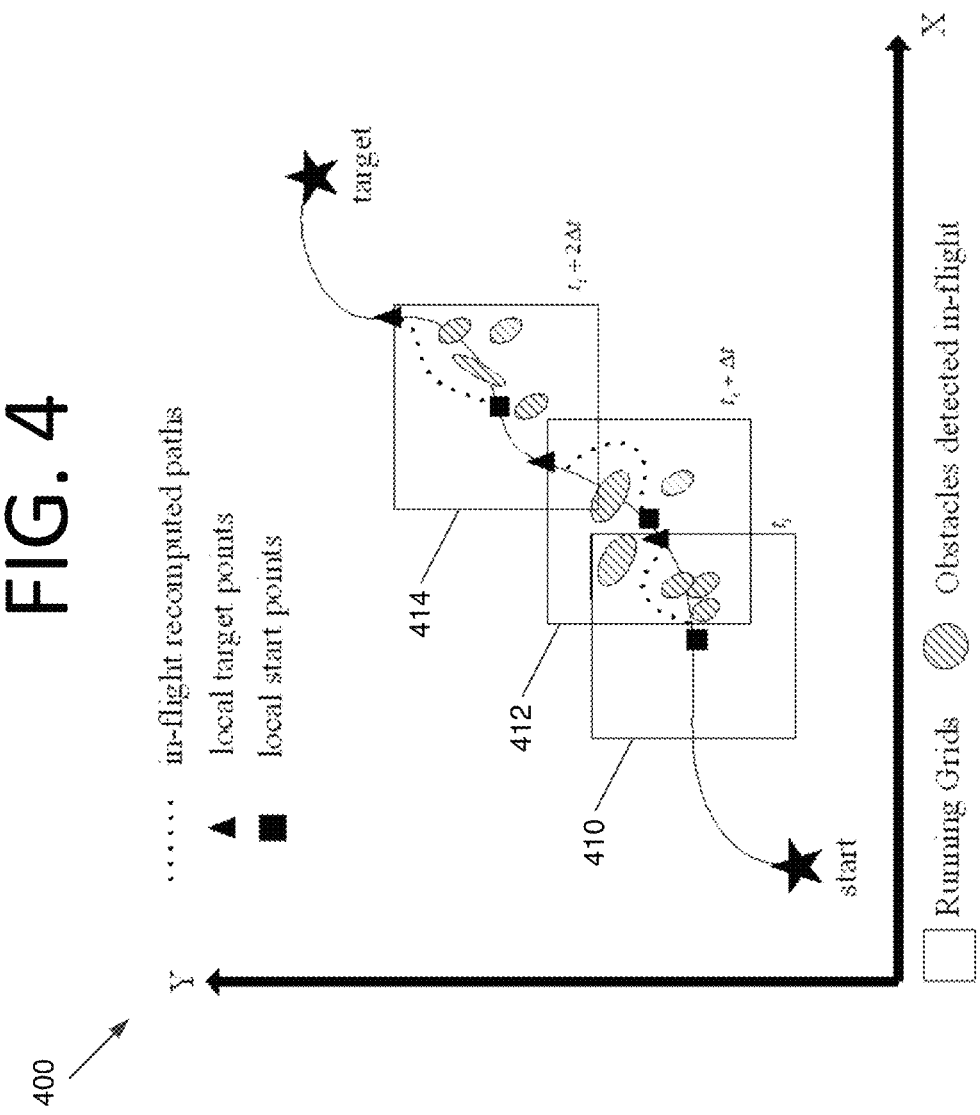
FIG. 4 is a terrain map illustrating running grids, according to an embodiment of the present invention.

Each terrain cell may be assigned a weight to be used by a shortest path-planning algorithm, reflecting the vehicle's overall LOS exposure to the surrounding terrain. This is particularly useful for military operations. The path planning process may be divided into two stages: (1) global path computation from the take-off position to the target position; and (2) in-flight path recomputation around the nominal global path, avoiding newly discovered obstacles. Global path computation may be performed before take-off based on the coarse terrain data available at the time. In-flight path recomputation may be performed on an axis-aligned square section of the database called the running grid. Computations within a smaller area surrounding aircraft have been done before, but the application of the running grid in embodiments disclosed herein is novel. For instance, the way some embodiments can expand and stitch with the previous global solution in order to guarantee a path has never been performed before. The running grid is typically centered on the present position of the vehicle, and may be of a size equal to twice the maximum range of the sensor suite, from the center of this section to its point of intersection with the global path. A terrain map 400 illustrating running grids 410, 412, and 414 at times $t_i$, $t_i+\Delta t$, and $t_i+2\Delta t$, respectively, is shown in FIG. 4.

The running grid in this embodiment is a square terrain and weights database segment that is centered on the vehicle's present position. The running grid is oriented parallel to the x-y axis in this embodiment and its boundaries depend on the sensor suite's maximum range—its side size is twice this maximum range. When the navigation path has to be recomputed, the weights of terrain cells inside the running grid are updated.

At each computation cycle, the information from the whole sensor suite is merged and incorporated into the terrain database in some embodiments. As such, no information is lost. The height and "confidence" values of each terrain cell, assigned as a function of sensor updates scanned, may be updated, and pointer links may be merged or built accordingly so that new data does not require extra memory. As such, the system "remembers" obstacles that have already been detected and always finds a safe navigation path.

The path generation process is sequential. The shortest path through the eight-connected grid graph from the local start to goal (i.e., points on the nominal global path) may be generated by the modified Dijkstra algorithm, providing a "basis line." Geometric smoothing is applied to this "basis line" to generate a smooth three-dimensional trajectory that can be realistically followed by the rotorcraft. Dynamic smoothing on the three-dimensional trajectory provides the maximum possible speed profile over the path, enabling an accurate time and fuel estimate (e.g., fossil fuel, battery power, or any other suitable fuel or power) for the specific rotorcraft mission.

Geometric smoothing generates a smooth, threat-and-collision-free "safe" three-dimensional flight path for the vehicle. The path may be computed up to a predetermined range from the present position or up to the maximum range to which there are reliable terrain database updates by the sensors along the nominal path. The rotorcraft may be taken as a body in space and not as a point mass in order to account for its profile. As such, the nominal flight path may be taken as the centerline of a rectangular cross-section "corridor" (or "tunnel") in space, where the cross-section sizes are determined by the dimensions and clearances necessary for the specific vehicle.

Horizontal plane "legality" (or "safety") of a nominal path line or arc requires the legality of the centerline, the right boundary, and the left boundary of the corridor. The "prices" over the three lines or arcs may be determined by the same subroutines used in Dijkstra's algorithm. If any of the three prices exceeds the original optimal path's price by a certain amount or percentage, then the nominal line or arc may be deemed "illegal" (or "unsafe"). Vertical plane "legality" requires the legality of the centerline, the upper boundary, and the lower boundary of the corridor, and may be determined by collision (or "contact") with the terrain profile. If any of the three lines (or arcs) intersects the terrain profile, then the nominal line or arc may be deemed illegal or unsafe.

Geometric smoothing may first involve generation of the smooth path in the (x, y) plane. The optimal path may be approximated by the longest legal straight lines, connected by the largest-radius legal tangent arcs. Each arc and line pair is called a horizontal geometrical unit (HGU).

Next, the smooth path may be generated in the (s, z) plane. Once the smooth path is generated in the (x, y) plane, the coordinate "s" may be defined along this path. A profile, or "cut," of the terrain may be generated along this path from terrain database height data, and a parallel profile at the nominal flight height may then be generated above the profile. A "lines-and-arcs approximation" to this second profile may be generated in the (s, z) plane by a different algorithm than in the (x, y) plane. "Dips" or "dives" may be minimized while still following the terrain since rotorcraft usually have low safety margins for negative acceleration. This algorithm was designed by modeling the way helicopter pilots tend to "hug" the terrain, but not really follow it, in NOE flight. The algorithm also minimizes the vertical control effort of the autopilot. Each arc and line in the (s, z) smoothed path is called a vertical geometrical unit (VGU). Dynamic smoothing requires flight test data on the specific rotorcraft, including speed vs. required flare distance data, maximum bank angles, maximum acceleration profiles, etc., and generates the maximum possible flight speed profile over the entire smooth trajectory.

The start and end points of the VGUs and HGUs along s may be determined, and the maximum allowable entry and exit speeds to the VGUs and HGUs may be computed. The tighter the arc, the more slowly a helicopter or other rotorcraft flies. Therefore, the speed at the end of the previous VGU should not exceed the maximum entry speed of the next VGU. The more inclined a VGU, the slower the rotorcraft needs to fly, constraining the speed on that section. Many other dynamic constraints may also be considered, for example, flare distance versus speed, maximum ascending and descending path angles versus speed, etc.

Speed at s=0 is the current speed vector, and speed at s=(clear path length) is generally taken as zero since the rotorcraft should be capable to complete flare and reach full hover at the end of the computed nominal path. Consequently, if any new object is detected along the path that obstructs the sensors' "view", and a safe new path cannot be found, the rotorcraft can still attain hover safely. In this case of "emergency hover," the rotorcraft may start an ascending spiral to perform a broad sensor sweep until a new path is found. Once the bounds of the speed profile are determined, the maximum acceleration and deceleration data for the rotorcraft may be used to compute the maximum physically feasible speed profile, minimum time, and fuel requirements. This profile may also be used by the rotorcraft control system.

Figure 5:
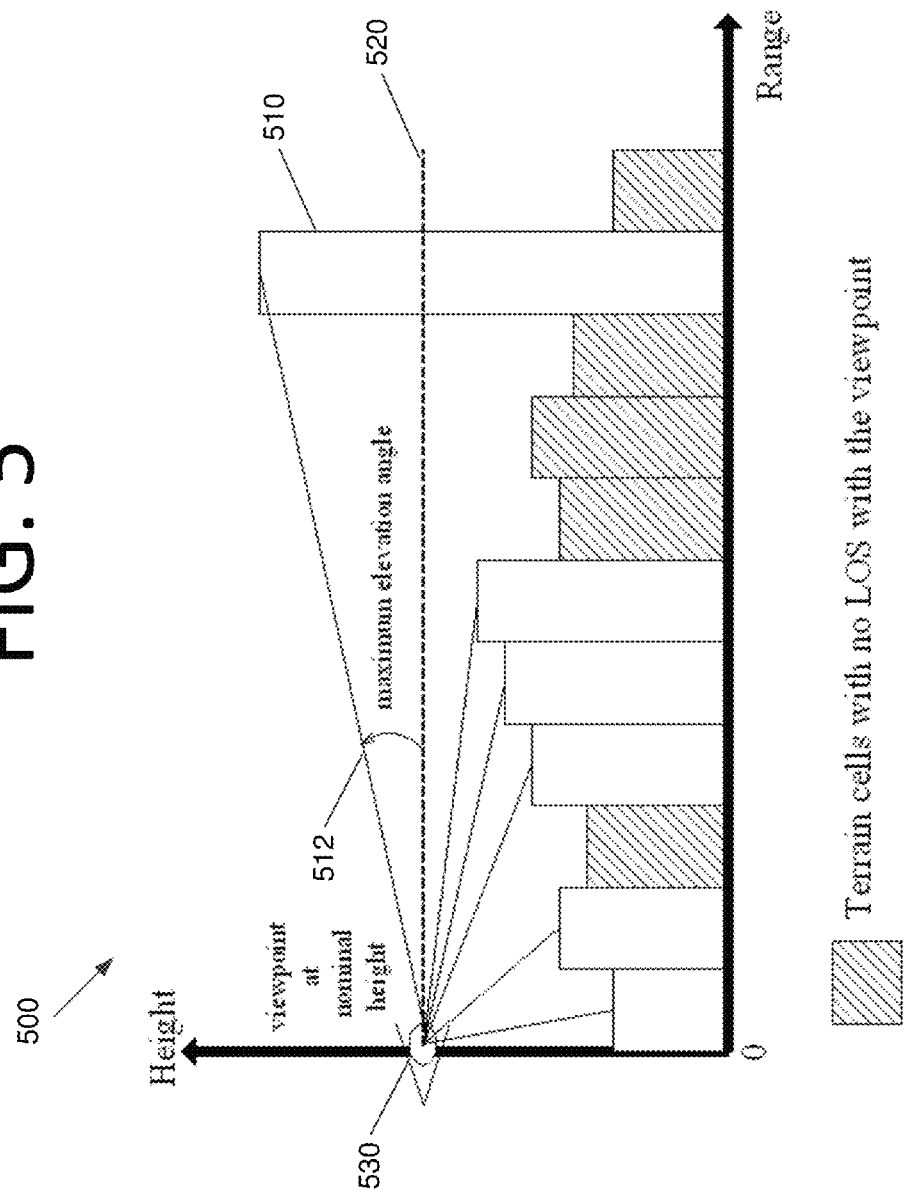
FIG. 5 is a graph illustrating computing visible and hidden cells along a line, according to an embodiment of the present invention.

In order to achieve NOE behavior, it is assumed in some embodiments that threats can become suddenly active at any point on the terrain. Therefore, each terrain cell may be assigned a weight to be used by a shortest path planning algorithm, reflecting its overall LOS exposure to the surrounding terrain. The less exposed terrain cell is, the more desirable it is to fly over that cell. The weight of each terrain cell $weight_i$ may be computed by visibility analysis of the surrounding terrain, up to a nominal radius (range) $R_{nom}$, given by $$\text{weight}_i = \frac{n_{LOS}}{n_{TOT}} \quad (1)$$

where $n_{LOS}$ is the number of cells within the radius that have LOS with the center at nominal altitude above the ground, and $n_{TOT}$ is the total number of cells within the nominal radius. This concept is illustrated in graph 500 of FIG. 5. The visibility of each grid cell 510 along a given line 520 from a viewing point 530 can be determined by computing an elevation angle 512 from viewing point 530 to each cell 510, increasing the range, and comparing the elevation angle with the maximal angle among all cells closer to the viewpoint. If the angle is greater than the maximal angle among all cells before it, then this cell is visible.

The circular region for weight computation around each cell may be subdivided into equal sectors so that each sector is at most one terrain cell wide at maximum range, given by $$\theta_{sector} \cong \arctan\left(\frac{d}{R_{nom}}\right) \quad (2)$$

where d is the terrain cell size. Visibility can be computed along the centerline of each sector, such that every terrain cell inside the region is evaluated at least once and tagged as "visible" (having LOS with the center cell) or "hidden" (no LOS with the center cell). Thus, $n_{Los}$ is the number of "visible" cells and $n_{TOT}$ is the number of visible cells plus the number of hidden cells.

Coarse initial terrain information may be assumed to be good enough to identify the main features of the terrain (e.g., hills, passes, canyons, etc.), but devoid of sufficient detail pertaining to obstacles close to the ground (e.g., trees, poles, antennas, wires, etc.). Therefore, it may be assumed that the globally optimal path computed with initial terrain information, and a globally optimal path computed having exact terrain information, would be roughly similar. As a consequence, local in-flight path recomputations within the running grid would yield a quasi-optimal path. In the worst case scenario, where an extremely large obstacle is detected on the path and running grid path recomputations fail, the running grid may be enlarged successively until a new path is found. The resulting path plan is not globally optimal, but it is likely the best possible solution given the in-flight recomputation constraints (e.g., short computation time, limited computational resources and fuel, and aircraft safety).

The shortest path planning algorithm may be a variation of Dijlstra's algorithm, where the nodes are located at the centers of the terrain cells and the cost of traversing a straight line arc from a cell to any of its 8-connected neighbors is given by $$\Delta C_{i\ to\ j} = \frac{l_{ij}}{d}(w_i + w_j) \quad (3)$$

where d is the cell size, $w_i$ and $w_j$ are the weights of cells i and j, respectively, and $l_{ij}$ is the distance between the terrain cells' centers. $l_{ij}$ may be computed as $$l_{ij} = \sqrt{(h_i - h_j)^2 + (x_i - x_j)^2 + (y_i - y_j)^2} \quad (4)$$

where $(x_i, y_i)$ and $(x_j, y_j)$ are the coordinates of cells i and j, respectively, and $h_i$ and $h_j$ are their respective heights. For diagonal neighbors, the cost of the arc yields $$\Delta C_{i\ to\ j, diag} = \sqrt{2 + \frac{(h_i - h_j)^2}{d^2}}(w_i + w_j) \quad (5)$$

and for 4-connected (i.e., up, down, left, and right) neighbors, $$\Delta C_{i\ to\ j, 4C} = \sqrt{1 + \frac{(h_i - h_j)^2}{d^2}}(w_i + w_j) \quad (6)$$

In order to accelerate the computation speed, $l_{ij}^2$ can be used for the arc cost instead of $l_{ij}$ to eliminate the need for relatively expensive square root computations. Moreover, if the terrain is not very steep, such that the difference in heights between adjacent cells is much smaller than the cell size (e.g., a difference of an order of magnitude), then the arcs can be computed as $$\Delta C_{i\ to\ j, diag} = \sqrt{2}(w_i + w_j) \quad (7)$$

$$\Delta C_{i\ to\ j, 4C} = (w_i + w_j) \quad (8)$$

This admissible heuristic allows for the minimization of path cost and distance at the same time, and the path found between start and target points is globally quasi-optimal within the computation domain.

The shortest path through the eight-connected grid graph from the local start to goal (i.e., points on the nominal global path) generated by the modified Dijkstra algorithm does not represent a valid flight path. Rather, it yields a rough design of the flight path's footprint on the x-y plane. See terrain representation 300 of FIG. 3. By analyzing the footprint, taking into account the present state of the rotorcraft and its flight envelope, the three-dimensional flight path for the rotorcraft may be generated.

Horizontal Path Generation

Figure 6:
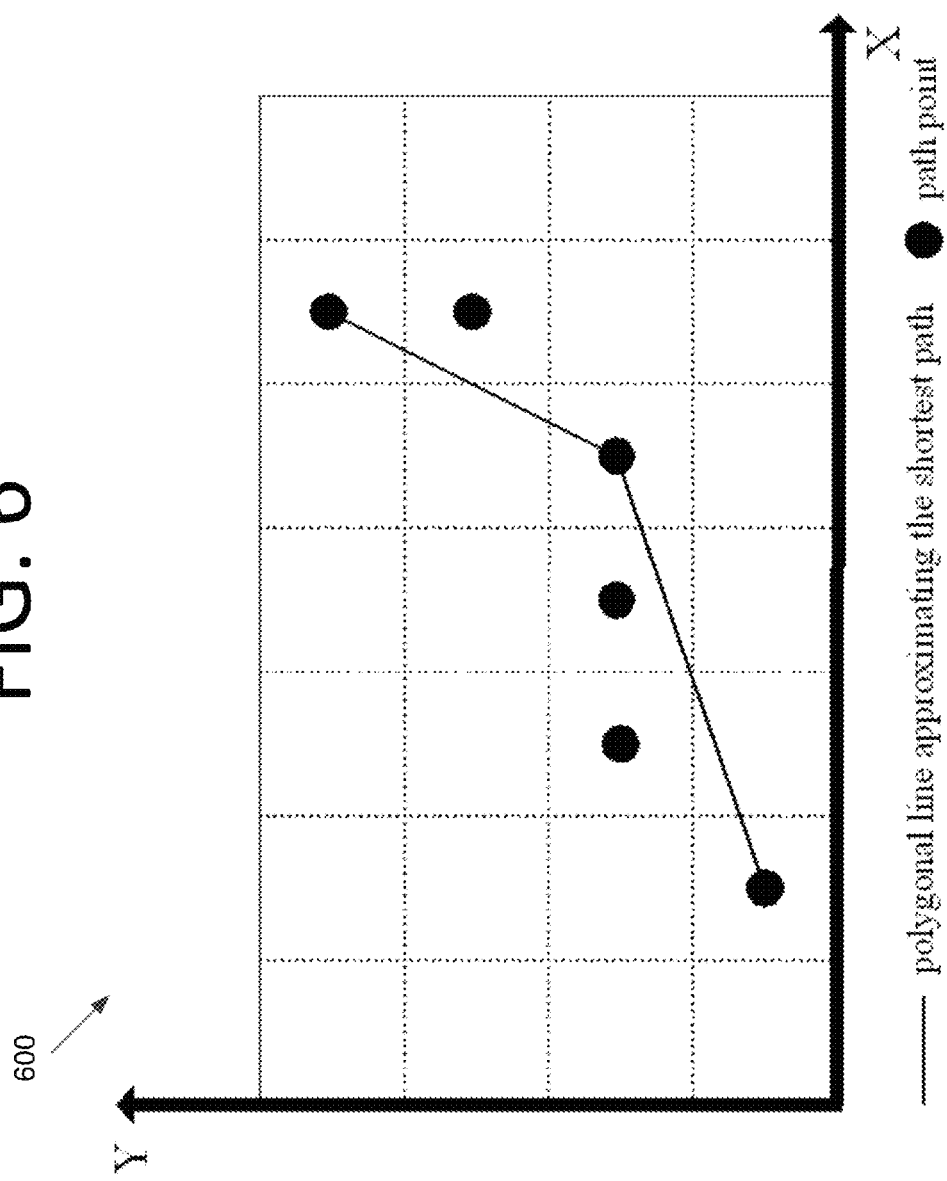
FIG. 6 is a graph illustrating an approximation of the shortest path by straight lines in the horizontal plane, according to an embodiment of the present invention.

A polygonal line (i.e., basis line) connecting the centers of the eight-connected cells on the shortest path is the basis for this lateral path. Its "cost" may be determined analogously to the costs in the modified Dijkstra path planning algorithm. This polygonal line may subsequently be approximated by the minimum possible number of straight lines between points on the basis path so that the new path cost does not exceed the basis path's cost by more than a given percentage. See graph 600 of FIG. 6.

Figure 7:
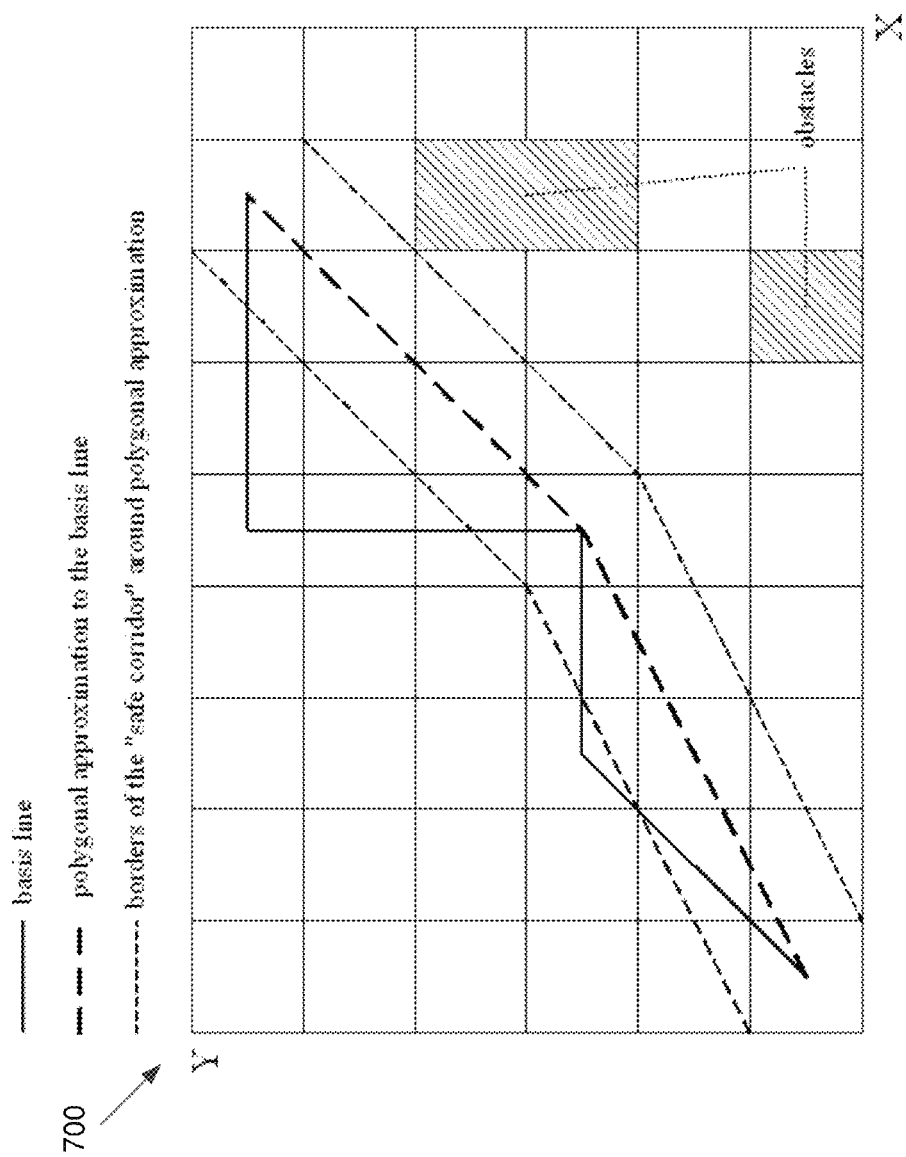
FIG. 7 is a graph illustrating a polygonal approximation to the basis line with its "safe corridor," according to an embodiment of the present invention.

The cost analysis takes into account a "corridor" around the nominal centerline. The width of the corridor is equal to two rotor diameters in this embodiment, ensuring the safety of the aircraft throughout its length while not making the corridor unnecessarily large. See graph 700 of FIG. 7.

The horizontal path in this embodiment is designed to start at the present position, aligned with or tangent to the velocity vector. As such, if the first line is not aligned with the velocity vector, an arc that is tangent to this vector may be designated as the first HGU, and the first line may be modified to also be tangent to this arc.

Figure 8:
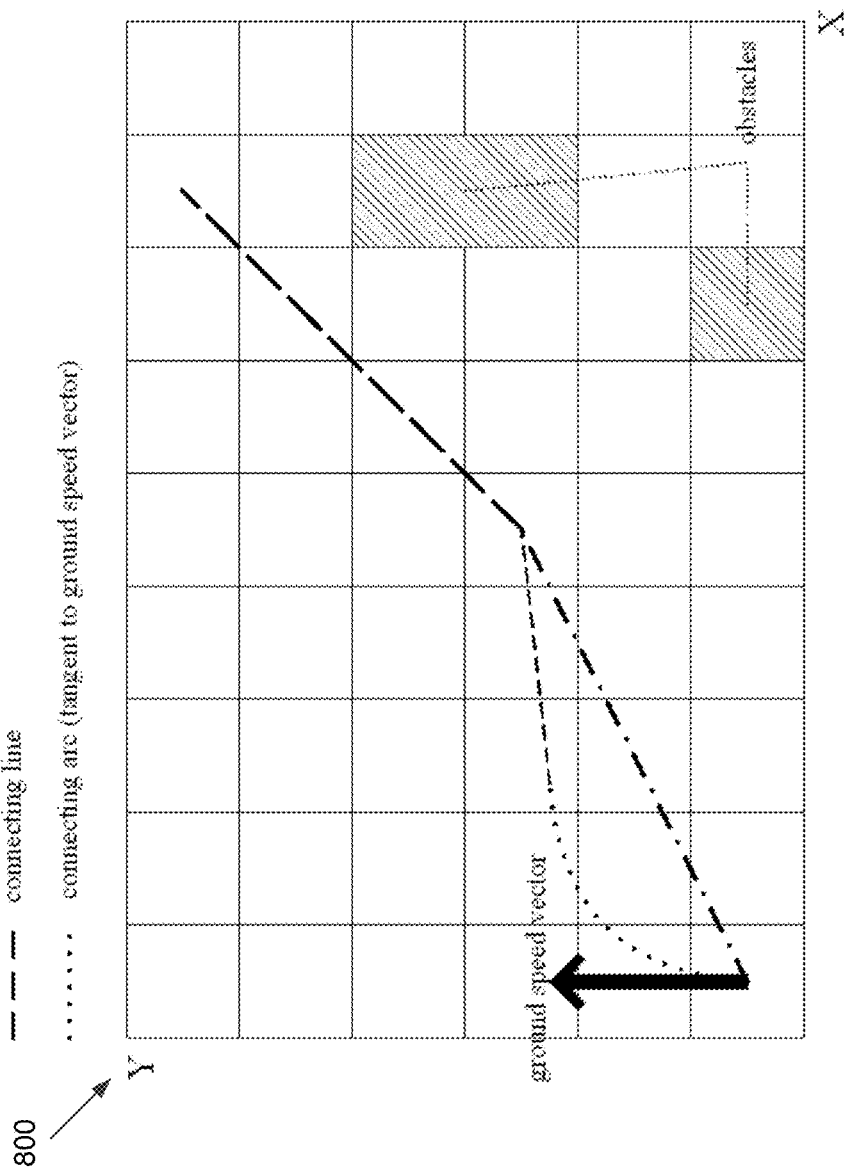
FIG. 8 is a graph illustrating design of a first arc line that makes the new path tangent to the instantaneous ground speed vector, according to an embodiment of the present invention.

According to the equation for centripetal acceleration, $$a = \frac{v^2}{R} \quad (9)$$

where a is acceleration, v is velocity, and R is the arc's radius. R should be designed to be larger than or equal to $$R_{min} = \frac{v_{tg}^2}{a_{max,LAT}} \quad (10)$$

where $a_{max,LAT}$ is the maximum lateral load factor and $v_{tg}$ is the tangent velocity. See graph 800 of FIG. 8. Note that small, state-of-the-art, multi-rotor UASs are capable of performing very tight, uncoordinated maneuvers that violate Equation 10. However, such maneuvers may be unsafe and/or energy-wasteful, and they may result in reduced sensor updates on the terrain.

Figure 9:
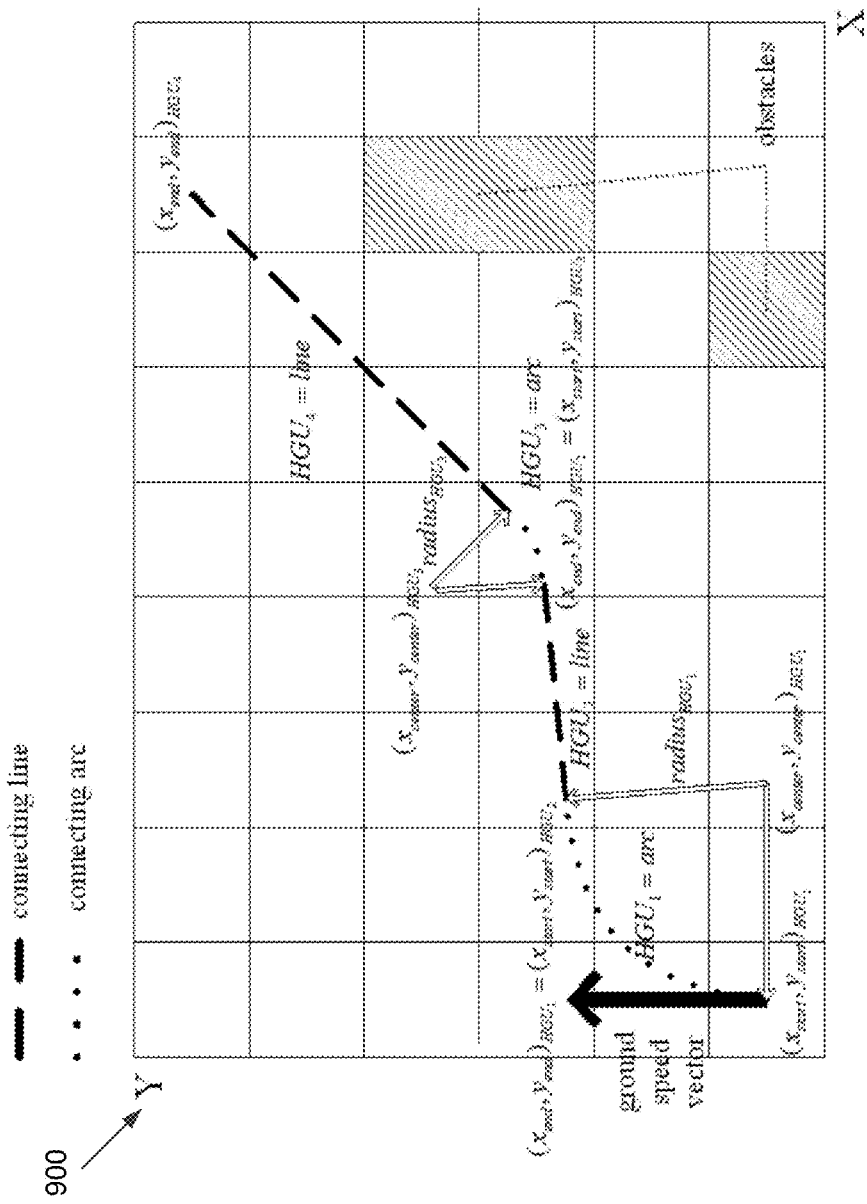
FIG. 9 is a graph illustrating geometric smoothing in the horizontal plane, according to an embodiment of the present invention.

Subsequently, the lines approximating the basis path are connected with tangent arcs. The arcs are designed to have the maximum possible radii since small radii imply low speeds for the maximum possible lateral acceleration, which is a dynamic constraint of the rotorcraft. However, the resultant path is still required to comply with the cost and "legality" requirements mentioned above. A connecting arc with a radius of half the terrain cell size is always legal since the cell size is chosen to be equal to two rotor diameters in this embodiment. Thus, the algorithm connecting the lines is always successful. Also, a legal line can always be found between two neighboring terrain cells. Therefore, the horizontal path generation algorithms are successful and yield a smooth flight path footprint composed of lines and arcs (i.e., the HGUs). See graph 900 of FIG. 9.

Vertical Path Smoothing

Figure 10:
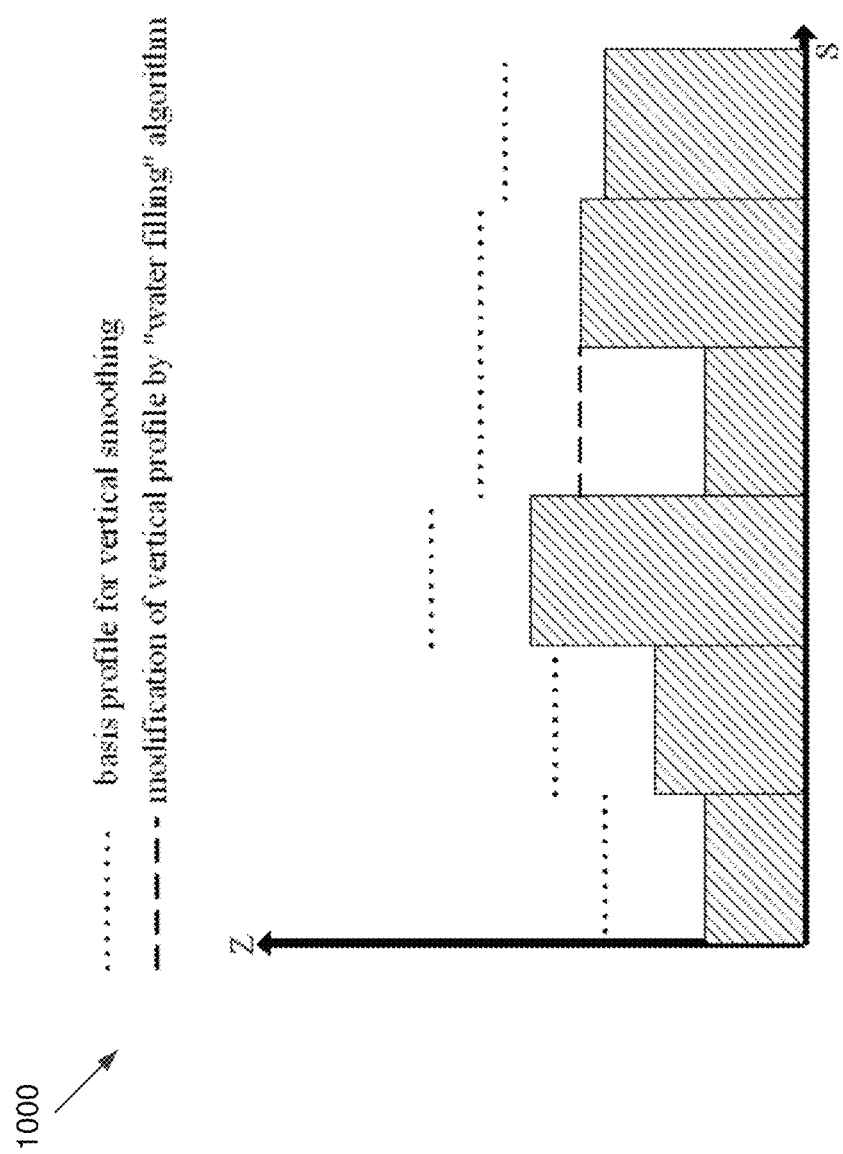
FIG. 10 is a graph illustrating construction of a basis vertical profile along the horizontal smoothed path, according to an embodiment of the present invention.

The basis profile may be analyzed to determine regions of positive and negative average slopes. The points where the slope changes from positive to negative are called "peaks." The regions between peaks are called "dips." In order to minimize dives, the dips that are too narrow may be eliminated by covering them as if they were filled with water. See graph 1000 of FIG. 10.

Figure 11:
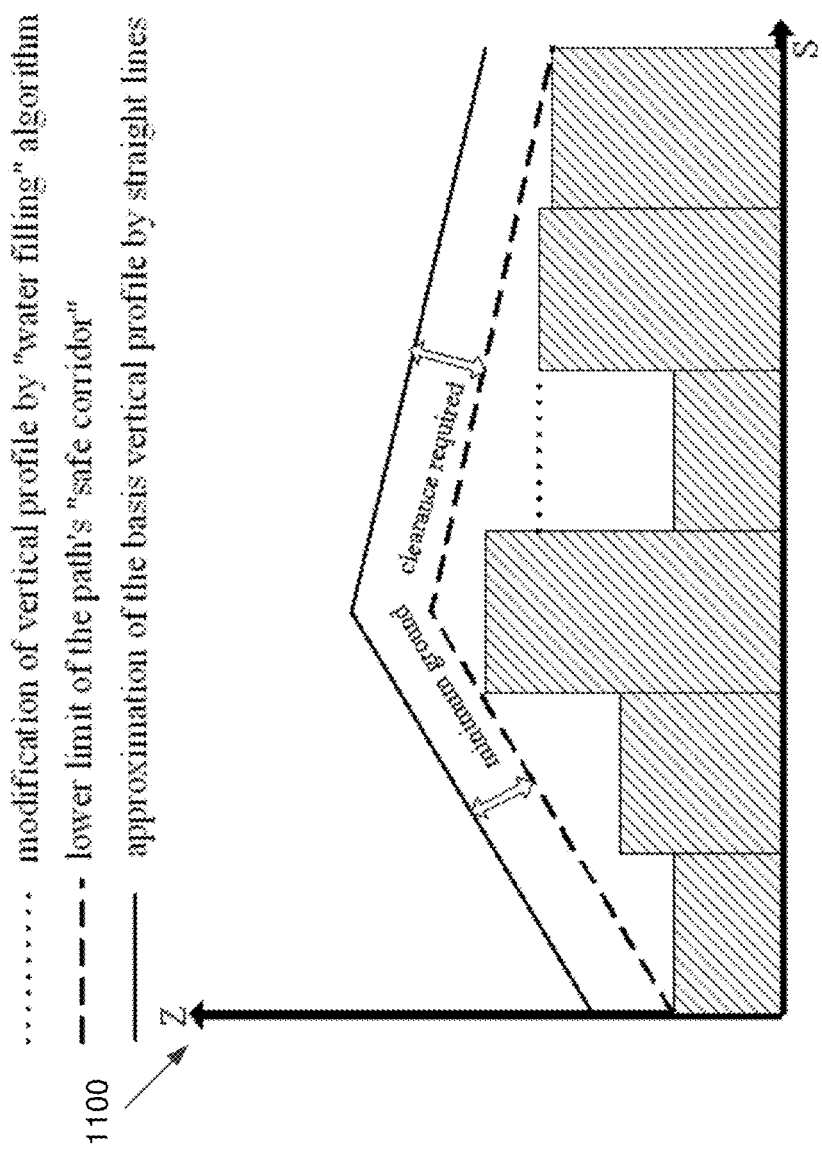
FIG. 11 is a graph illustrating an approximation of the vertical basis profile by straight lines, according to an embodiment of the present invention.
Figure 12:
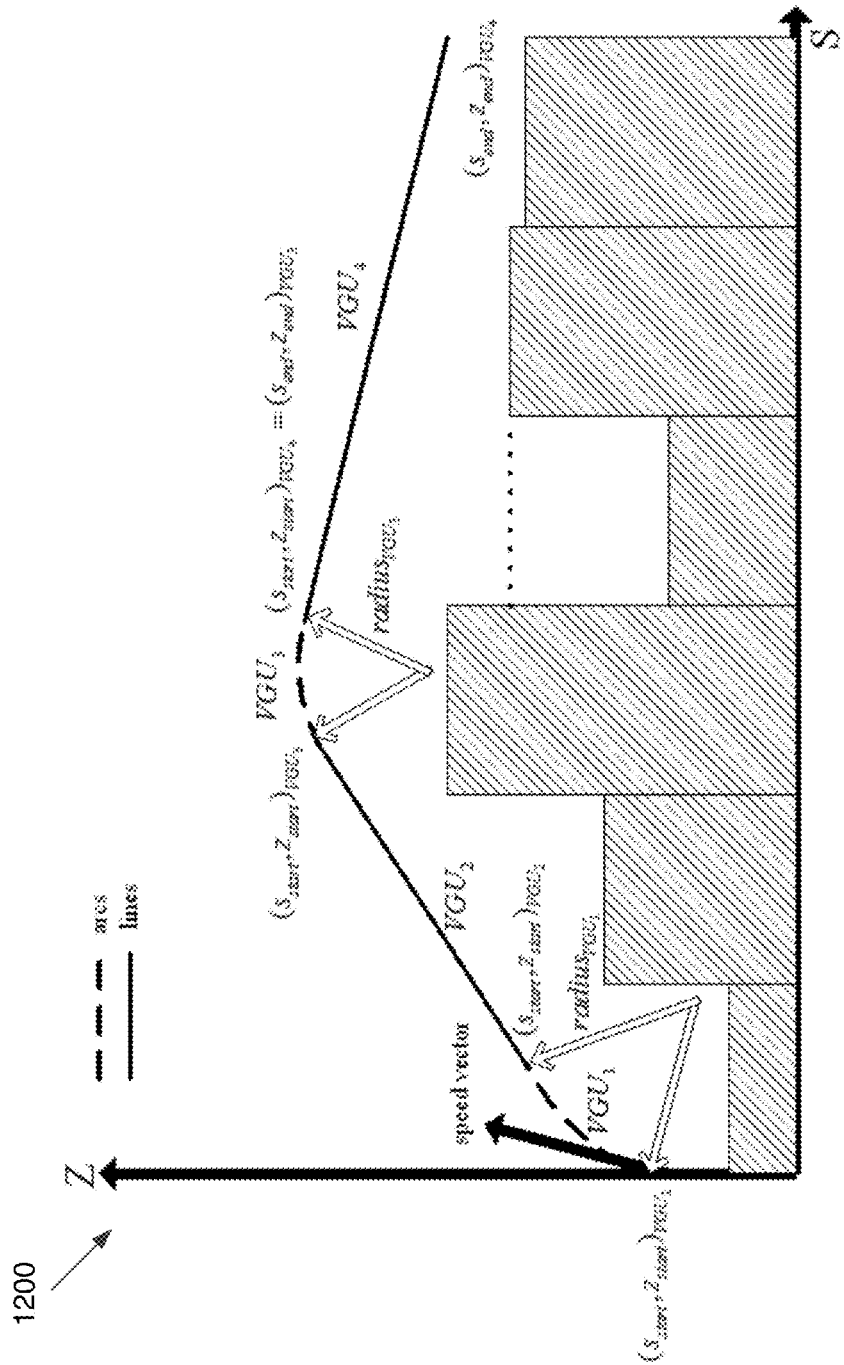
FIG. 12 is a graph illustrating geometric smoothing in the vertical plane along the x-y path footprint, according to an embodiment of the present invention.

The resultant path may then be approximated by straight lines in the s-z plane that do not exceed maximum slope limitations, do not violate clearance requirements from the terrain profile, and do not deviate too much from the basis nominal profile without dips. See graph 1100 of FIG. 11. The amount of deviation that is permitted may be programmable and determine behaviors of the system that can be tailored to specific missions/platforms. Arcs may then be used to connect the resulting lines, having the maximum possible radii to minimize vertical accelerations while still fulfilling the "vertical legality" requirements mentioned above. See graph 1200 of FIG. 12. Tangency of the speed vector to the path in the vertical plane may be achieved through a connecting arc of a radius greater than or equal to $R_{min}$ applied to the maximum allowed vertical centripetal acceleration and the speed value.

Dynamic Smoothing

The generation of a maximum ground speed profile for a given rotorcraft flying along the smooth path described above as a function of s is called "dynamic smoothing." Dynamic smoothing is a function of the maximum distance along the path traversed over terrain cells that have been scanned by the sensors D_clear. The heights of the cells are known with a high degree of certainty. Minimum-time, maximum-fuel-saving trajectory planning is based on dynamic smoothing. This approach to trajectory planning is unique to embodiments described herein.

In this approach, the ground speed at s=0 (i.e., the present position) in dynamic smoothing analysis should be the present (i.e., instantaneous) speed, and the speed at s=D_clear is taken as zero to ensure survivability even in the worst case scenario where no new path has been sufficiently scanned by the sensors and a large obstacle blocks the current path. Path recomputation is generally required when D_clear falls below a certain threshold. In this case, the running grid size may be increased in an attempt to find an alternate solution around the obstacle. In the worst-case scenario, flare may be commanded along the current safe path. The rotorcraft may achieve hover if its path is blocked by a large obstacle, and enlarging the running grid up to a predetermined size also does not yield a safe path. The rotorcraft may then initiate a rising spiral maneuver, scanning its surroundings with the sensors until a new safe path is found. If sufficient sensors are present on the rotorcraft, alternatively, the rotorcraft may simply rise to a height sufficient to discover a new safe path.

Once the horizontal and the vertical path have been generated, maximum speed limits can be determined for each arc and line in the horizontal and vertical planes. Also, there is generally a maximum allowed speed for NOE flight, specified by mission guidelines, that is not to be exceeded even in cases where the dynamic constraints would permit very high speeds. In the vertical plane, for straight lines, the slope determines the maximum allowed speed. For arcs, the radius R and maximum allowed vertical acceleration a for push-downs and pull-ups will determine the maximum speed v_max. For vertical maneuvers, the maximum speed may be roughly approximated by $$v_{max\ push-down} = \sqrt{a_{maxpush-down} * R} \quad (11)$$

$$v_{max\ pull-up} = \sqrt{a_{maxpull-up} * R} \quad (12)$$

Figure 13:
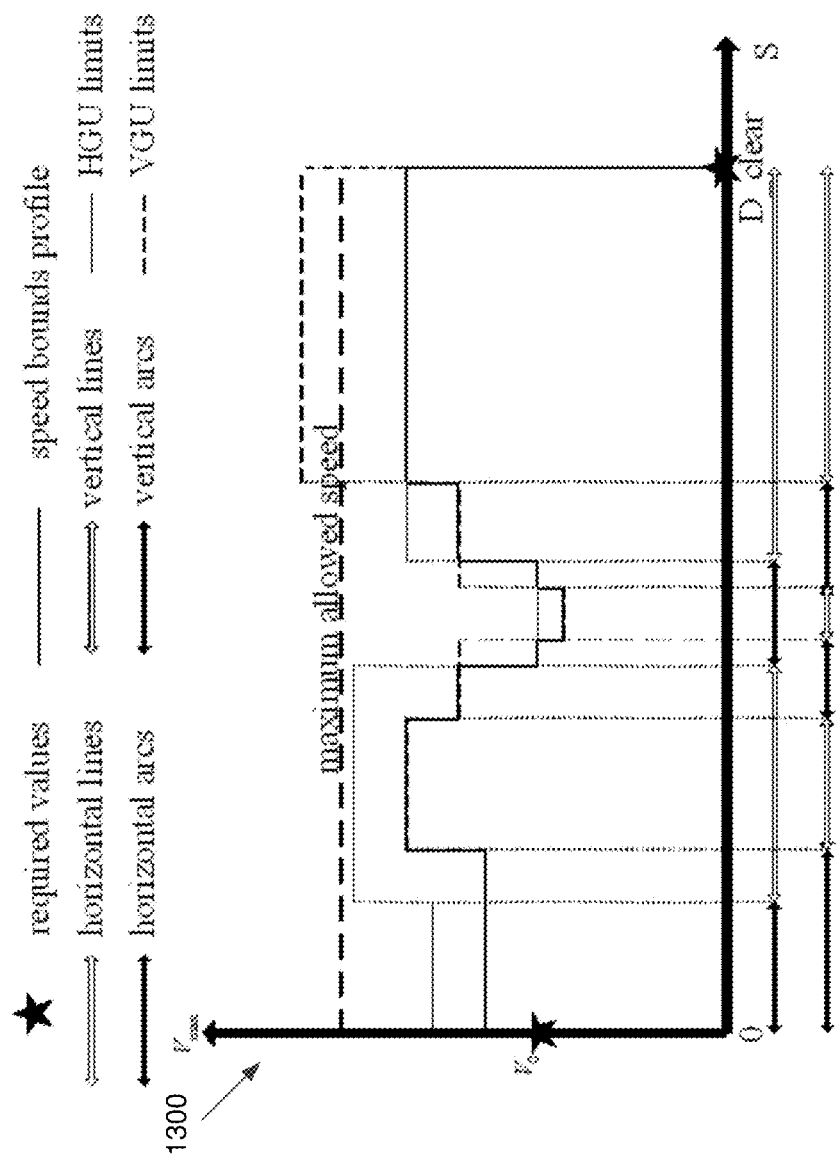
FIG. 13 is a graph illustrating computation of a maximum speed bounds profile, according to an embodiment of the present invention.

The "speed bounds graph" thus generated becomes the "bounding box" for the dynamic smoothing final graph. See graph 1300 of FIG. 13.

Figure 14:
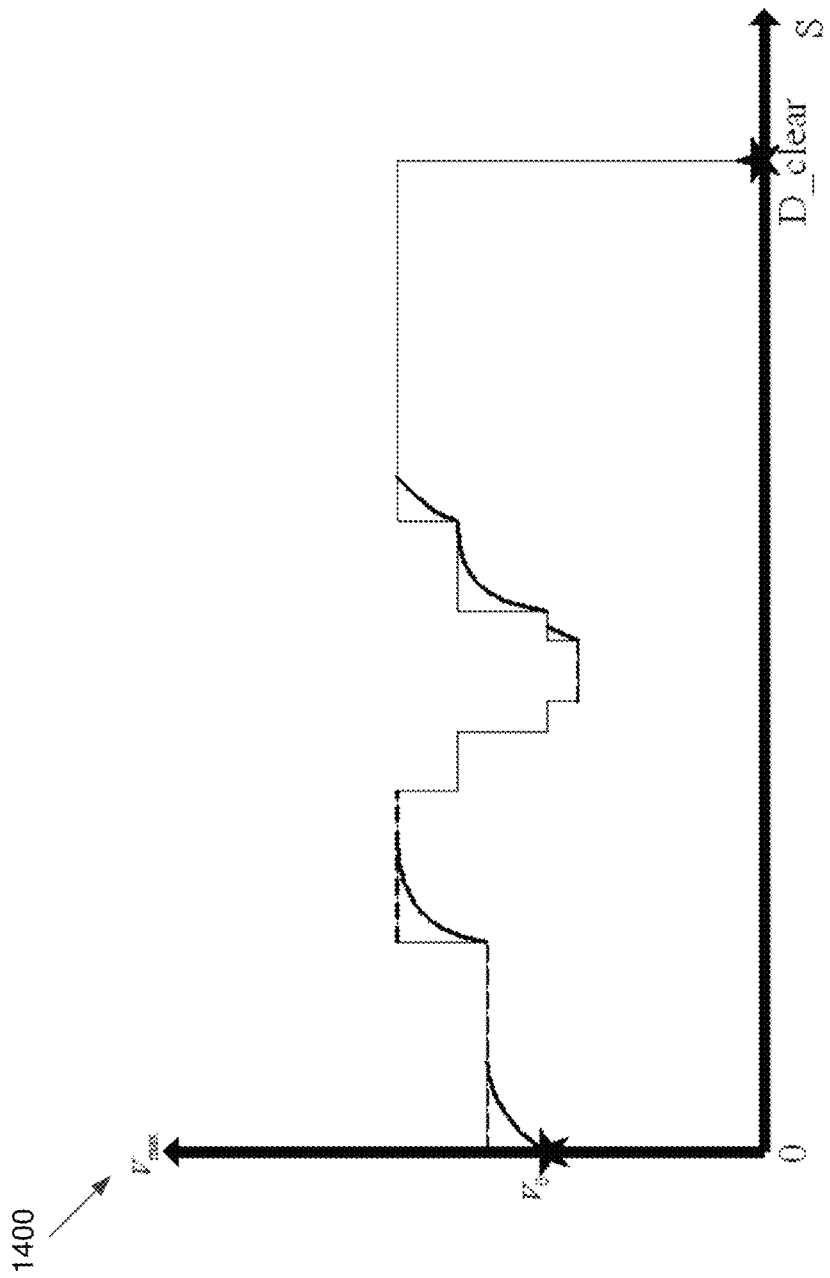
FIG. 14 is a graph illustrating maximum acceleration dynamic constraints applied to the speed bounds profile, according to an embodiment of the present invention.
Figure 15:
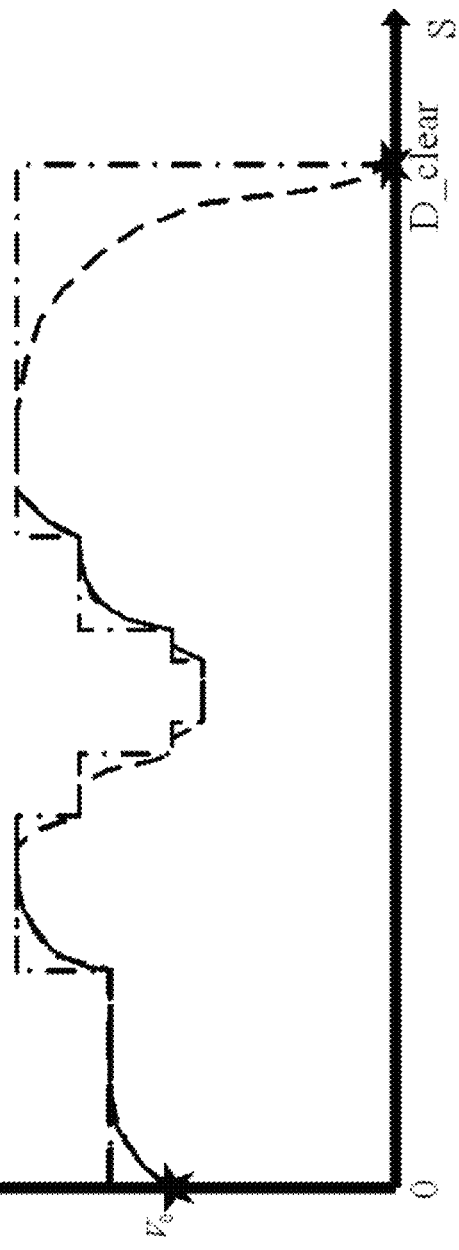
FIG. 15 is a graph illustrating maximum deceleration dynamic constraints applied to the speed bounds profile, according to an embodiment of the present invention.
Figure 16:
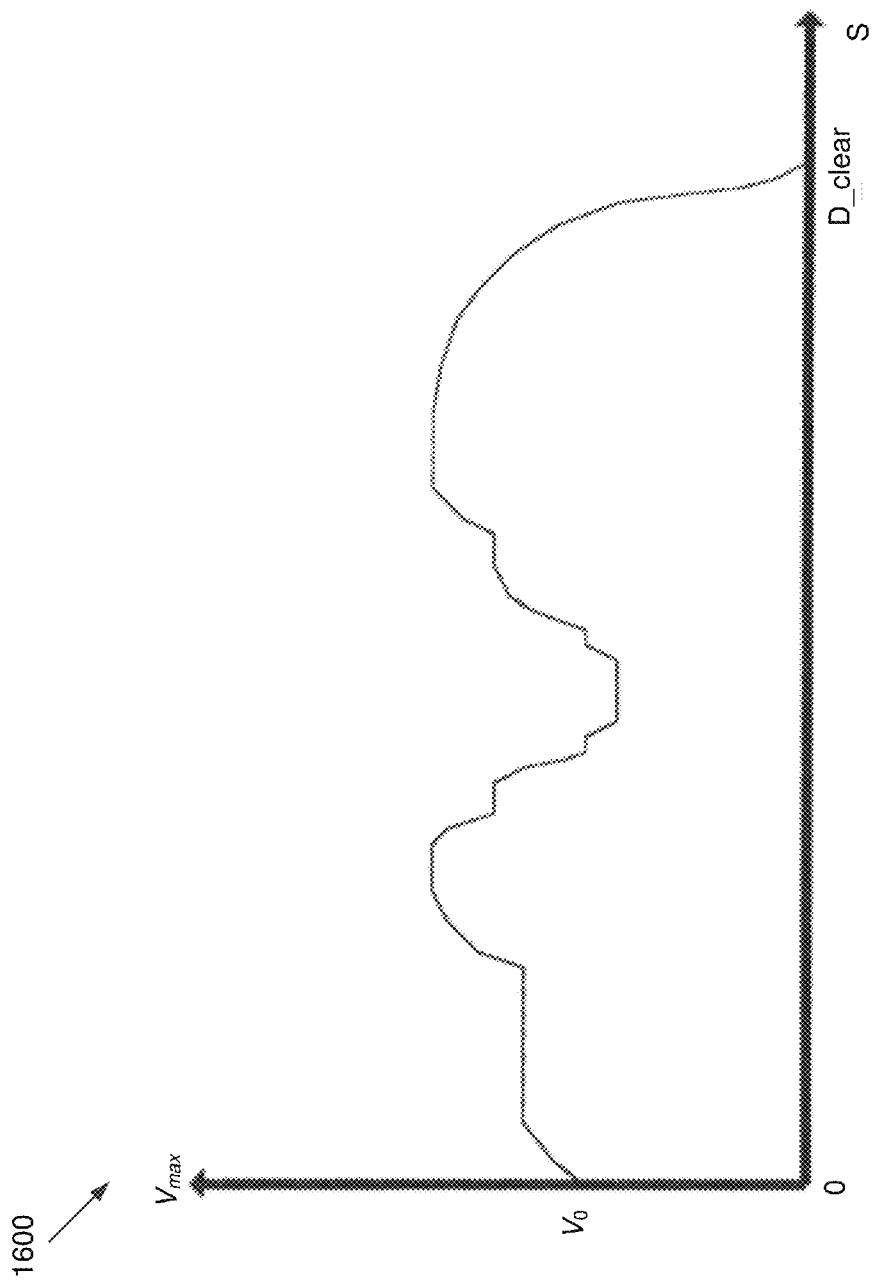
FIG. 16 is a graph illustrating a dynamic smoothing speed profile, according to an embodiment of the present invention.

In order to generate the dynamic smoothing final profile, the acceleration curves for the rotorcraft are applied at each point of the speed bounds graph where there is an increase (i.e., step up) in speed, beginning from the current speed at s=0. See graph 1400 of FIG. 14. The flare (deceleration) curves are then applied backwards from s=0 to s=D_clear at each point of the speed bounds graph where there is a falling step in speed, beginning from zero speed at s=D_clear. See graph 1500 of FIG. 15. The dynamic smoothing final profile is obtained from the minimum of the values of the bounds, acceleration, and deceleration graphs. The final profile represents the maximum speed profile physically possible for the given rotorcraft, and allows precise fuel (worst case) and time (best case) trajectory computations. See graph 1600 of FIG. 16.

Figure 17:
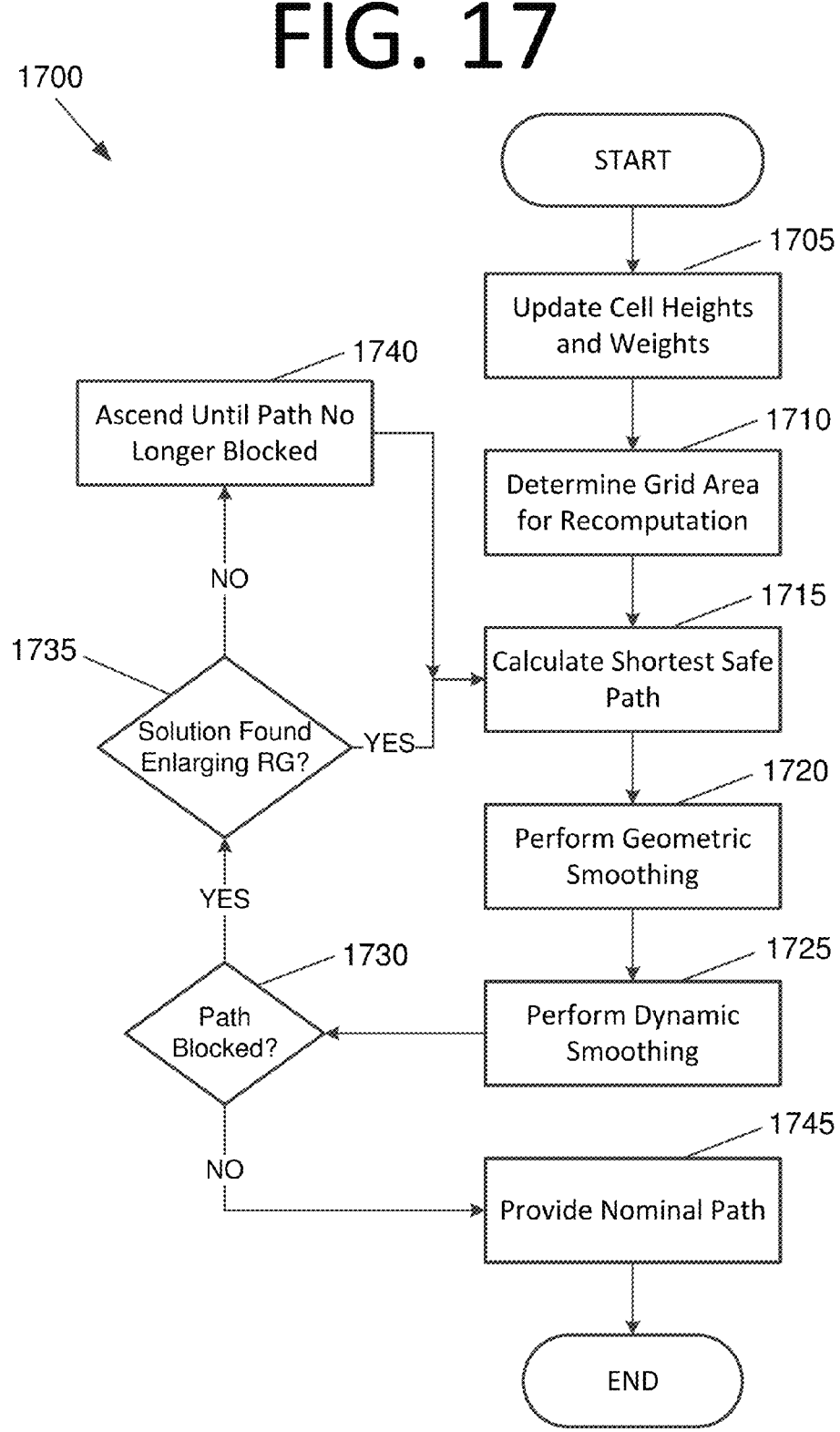
FIG. 17 is a flowchart illustrating a process for determining a flight path for a rotorcraft, according to an embodiment of the present invention.

FIG. 17 is a flowchart 1700 illustrating a process for determining a flight path for a rotorcraft, according to an embodiment of the present invention. The process begins with updating cell heights and weights according to sensor input at 1705. The cells are determined a-priori, and the cell information may then change based on sensor information. In some embodiments, a weight may be assigned to each of the cells, wherein the weight reflects overall LOS exposure to terrain surrounding each cell. In certain embodiments, the height and weight for a cell may be recomputed when the cell's height changes more than a certain percentage based on sensor information. The grid area for recomputation may then be determined at 1710 (i.e., the size of the running grid).

A shortest safe path is then calculated through the grid graph from a local start to a local goal defined as points on a nominal global path at 1715. The calculating of the shortest safe path may include determining a corridor including a cross-section that takes into account dimensions and clearances for the rotorcraft. In some embodiments, the calculation of the shortest path may also include determining horizontal plane legality of the nominal path, a right boundary, and a left boundary of the corridor. In certain embodiments, the calculation of the shortest path may include determining vertical plane legality of the nominal path, an upper boundary, and a lower boundary of the corridor.

Geometric smoothing is then performed on a basis line from the local start to the local goal to generate a smooth three-dimensional trajectory that can be followed by the rotorcraft at 1720. The geometric smoothing may include generating a smooth path in an x-y plane. In some embodiments, an optimal path may be approximated by longest legal straight lines connected by largest radius legal tangent arcs, where each arc and line form a HGU. In certain embodiments, the geometric smoothing may include generating a smooth path in an s-z plane. In some embodiments, a quasi-optimal path may be approximated by minimizing dives while following terrain, where each arc and line in the smoothed path form a VGU.

Dynamic smoothing is performed on the three-dimensional trajectory at 1725 to provide a maximum possible speed profile over a path defined by the dynamic smoothing. The dynamic smoothing may include determining HGU and VGU start and end points along s in an s-z plane and calculating maximum allowable entry and exit speeds for the start and end points. In some embodiments, speed at s=0 is a current speed vector and speed at s=(clear path length) is taken as zero to ensure that the rotorcraft is capable of completing flare and reaching full hover at an end of the cleared nominal path.

If the path is blocked at 1730, the system enlarges the running grid in an attempt to find a solution at 1735. In some embodiments, the running grid may be enlarged at most to a predetermined maximum size. If the path is still blocked after enlarging the running grid, an ascent or ascending spiral of the rotorcraft is initiated and a sensor sweep is performed at 1740 until a new path is detected where the obstacle is no longer blocking, and the process returns to 1715. If the path is not blocked after enlarging the running grid at 1735, the process also returns to 1715. Geometric smoothing and dynamic smoothing are again performed. If the path is clear, a nominal path and speed profile is provided at 1745 to be used by an autopilot to control the rotorcraft to fly along the defined path.

Figure 18:
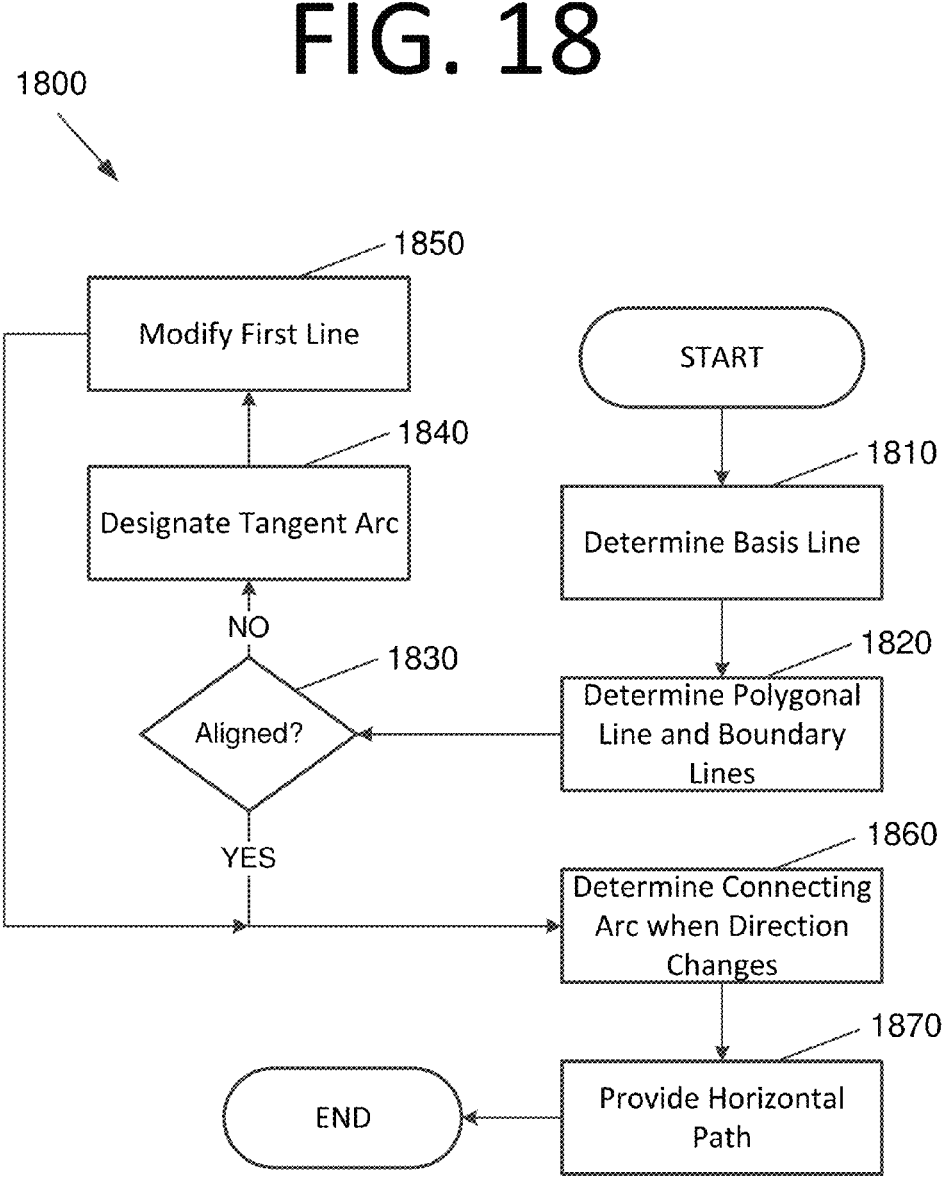
FIG. 18 is a flowchart illustrating a process for performing horizontal path smoothing, according to an embodiment of the present invention.

FIG. 18 is a flowchart 1800 illustrating a process for performing horizontal path smoothing, according to an embodiment of the present invention. A basis line through points at centers of 8-connected cells is determined on a modified Dijkstra shortest path through a grid graph from a start point to an end point at 1810. A polygonal line defining a minimum possible number of straight lines between points on the basis line and its parallel boundary lines are then determined at 1820. The polygonal line connects the start point and the end point. The boundary lines are part of the criteria for choosing the polygonal line. The boundary lines of the corridor are determined by dimensions and clearances for the rotorcraft. Legality of the polygonal line and the boundary lines may also be determined. When a first line of the polygonal line is not aligned with a velocity vector of the rotorcraft at 1830, an arc is designated at 1840 that is tangent to the velocity vector as a first horizontal geometrical unit, and the first line of the polygonal line is modified at 1850 to be tangent to the arc.

When a direction of a line segment of the polygonal line changes, a connecting arc is determined at 1860 for each change in direction to generate a horizontal path. In some embodiments, connecting arcs have a radius of half a size of the 8-connected cells. A horizontal path is provided to an autopilot at 1870 based on the determinations, which may then control the rotorcraft based on the horizontal path.

Figure 19:
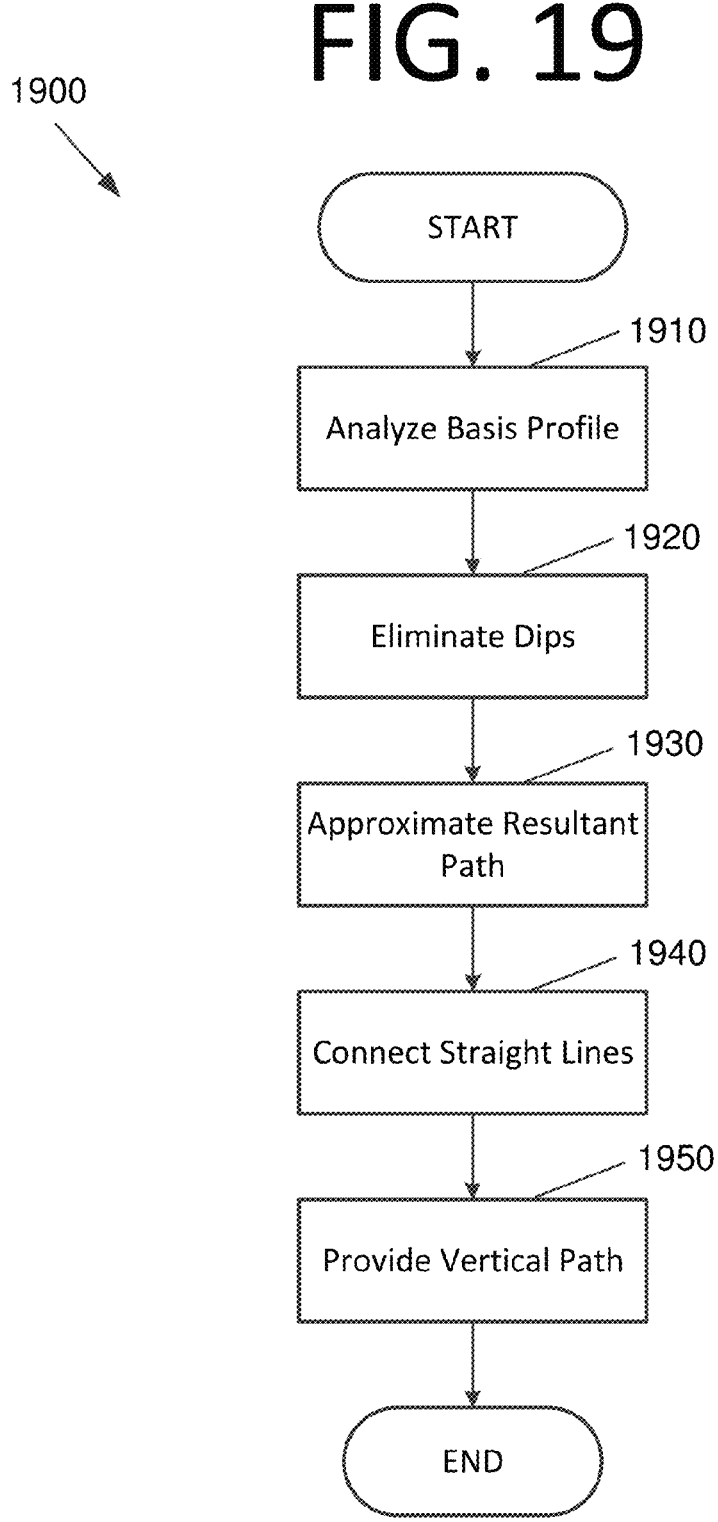
FIG. 19 is a flowchart illustrating a process for performing vertical path smoothing, according to an embodiment of the present invention.

FIG. 19 is a flowchart 1900 illustrating a process for performing vertical path smoothing, according to an embodiment of the present invention. A basis profile is analyzed at 1910 to determine regions of positive and negative average slopes. The basis profile may follow a smooth path in an x-y plane. Dips that are less than a predetermined distance are then eliminated by filling these dips at 1920.

A resultant path is approximated at 1930 by straight lines in an s-z plane that do not exceed maximum predetermined slope limitations, do not violate clearance requirements from a terrain profile, and do not deviate more than a predetermined amount from the basis profile without dips. The straight lines are connected at 1940 using arcs having maximum possible radii to minimize vertical accelerations while fulfilling vertical legality requirements to generate a vertical path. The autopilot of the rotorcraft is then provided with the vertical path to control the rotorcraft to fly along the generated vertical path at 1950.

Figure 20:
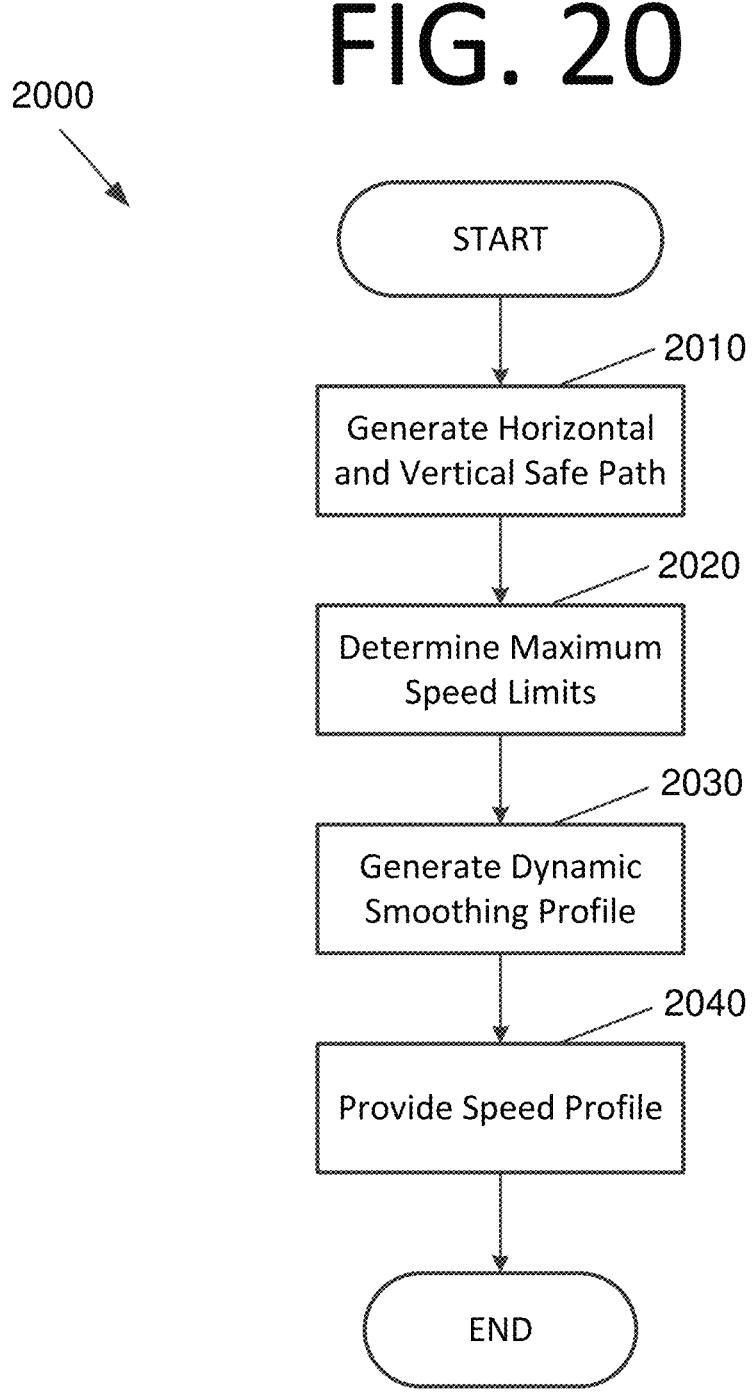
FIG. 20 is a flowchart illustrating a process for providing a speed profile for a rotorcraft, according to an embodiment of the present invention.

FIG. 20 is a flowchart 2000 illustrating a process for providing a speed profile for a rotorcraft, according to an embodiment of the present invention. A horizontal and vertical safe path are generated for the rotorcraft at 2010. The generating of the horizontal and vertical safe path may include generating a smooth path in an x-y plane and an s-z plane, respectively. Maximum speed limits are determined for each arc and line segment of the horizontal and vertical paths at 2020.

A dynamic smoothing profile is generated for the rotorcraft from a starting position to an end position at 2030. The dynamic smoothing profile generation may include determining horizontal safe path and vertical safe path start and end points along s in an s-z plane and calculating maximum allowable entry and exit speeds for the start and end points. Dynamic smoothing generates the speed profile. The speed profile is then provided to an autopilot at 2040 and the rotorcraft is controlled by the autopilot to fly at speeds in accordance with the speed profile from the starting position to the end position.

Figure 21:
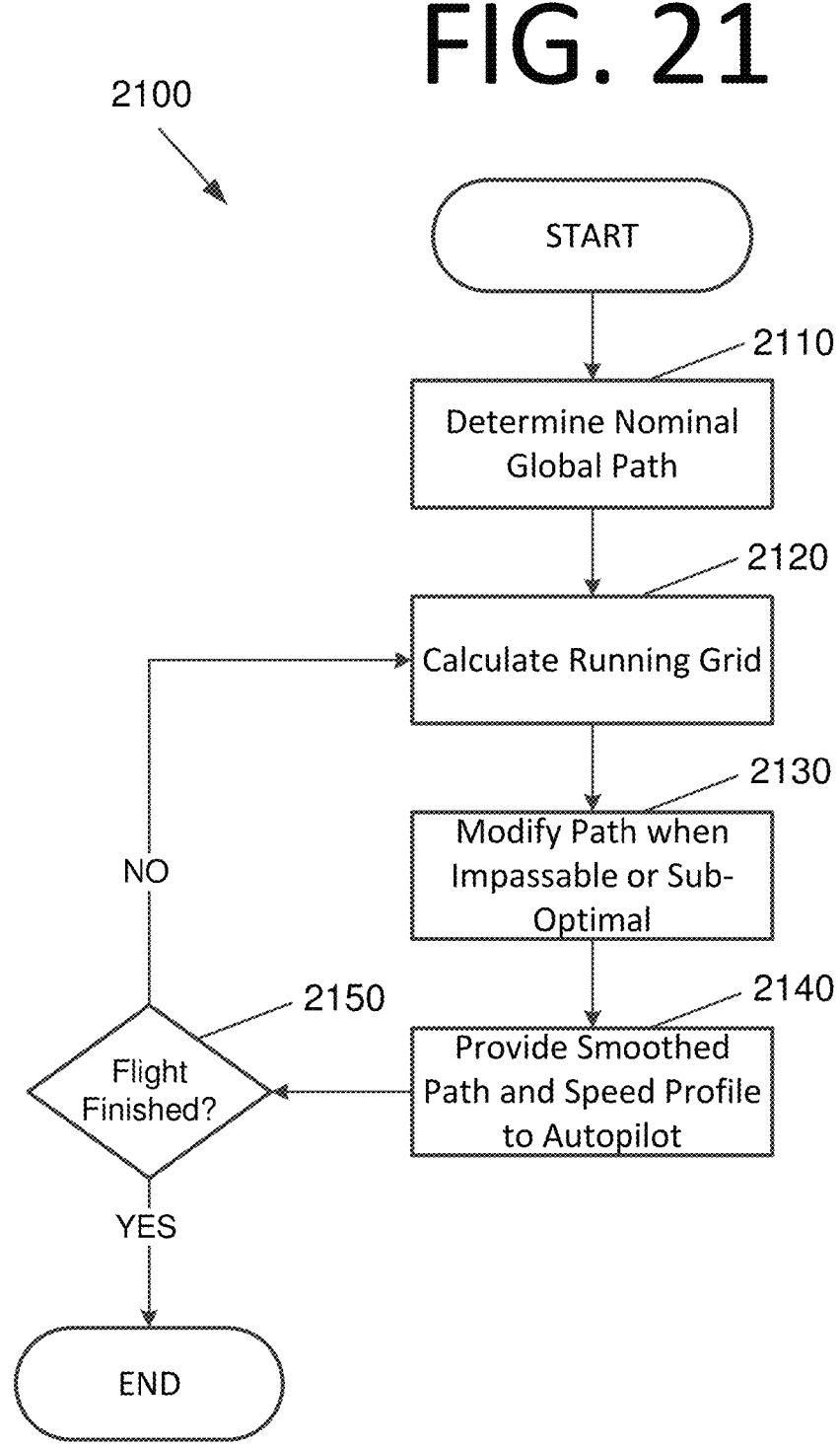
FIG. 21 is a flowchart illustrating a process for determining a flight path using running grids, according to an embodiment of the present invention.

FIG. 21 is a flowchart 2100 illustrating a process for determining a flight path using running grids, according to an embodiment of the present invention. A global nominal path is determined a-priori before flight or on power-up at 2110. A running grid is calculated with a predetermined size at 2120. The running grid includes a square terrain and weights database segment centered around a current position of a rotorcraft based on sensor information. The size of the running grid may be twice the range of the sensor suite of the rotorcraft in some embodiments.

When a portion of the global nominal path that passes through the running grid is not possible to traverse or sub-optimal, a more optimal path through the running grid is determined and the flight path is modified at 2130 to include the more optimal path through the running grid. When impassable, in some embodiments, the running grid may be enlarged up to a predetermined size, and/or an ascent or ascending spiral of the rotorcraft may be initiated and a sensor sweep may be performed. The smoothed path and speed profile is then provided to an autopilot to execute flight along the global nominal path at 2140. The running grid may be periodically recomputed and the process may be repeated if flight is not finished at 2150.

Figure 22:
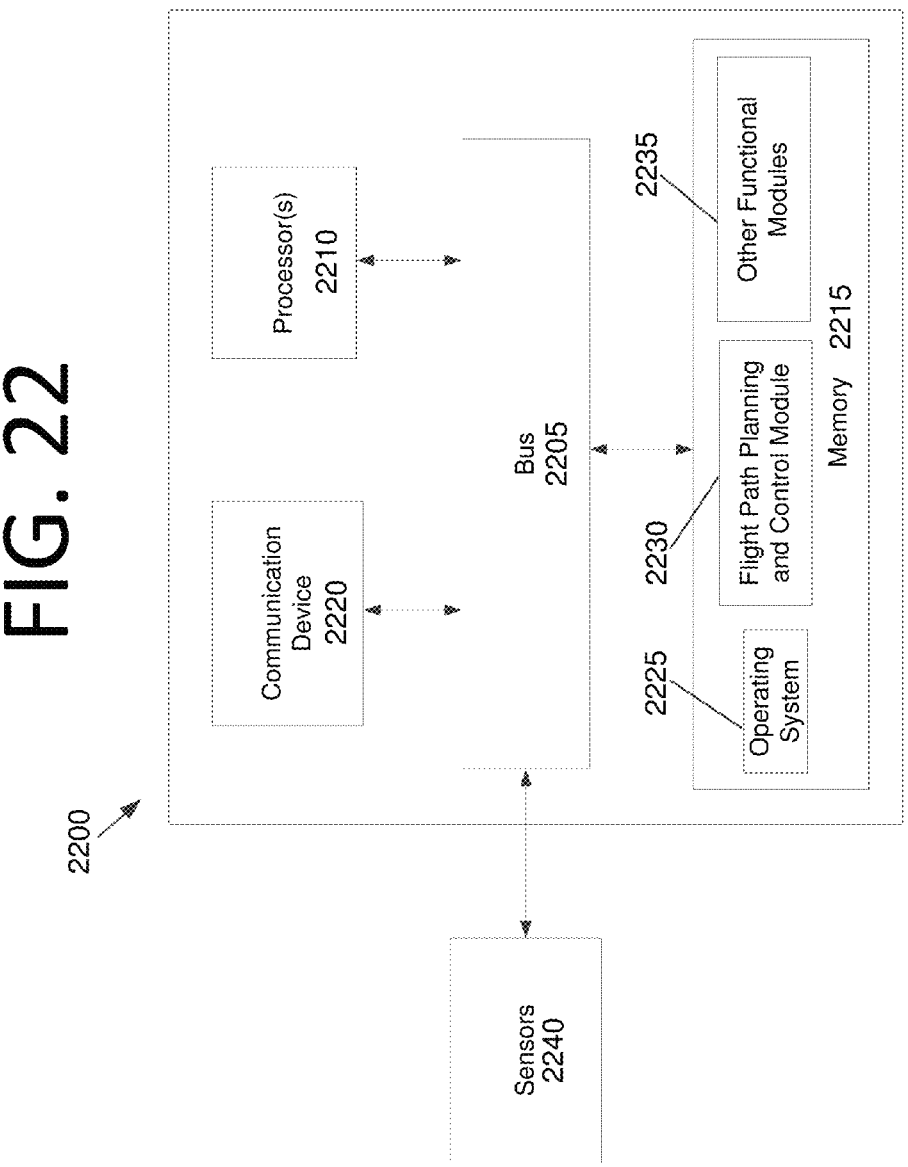
FIG. 22 is a block diagram illustrating a computing system configured to perform flight path planning and control for a rotorcraft, according to an embodiment of the present invention.

FIG. 22 is a block diagram illustrating a computing system configured to perform flight path planning and control for a rotorcraft, according to an embodiment of the present invention. In some embodiments, computing system 2200 may execute the processes of FIGS. 17-21. System 2200 includes a bus 2205 or other communication mechanism for communicating information, and processor(s) 2210 coupled to bus 2205 for processing information. Processor(s) 2210 may be any type of general or specific purpose processor, including a central processing unit (CPU) or application specific integrated circuit (ASIC). System 2200 further includes a memory 2215 for storing information and instructions to be executed by processor(s) 2210, as well as storing the height and weights of the terrain database. Memory 2215 can be comprised of any combination of random access memory ("RAM"), read only memory ("ROM"), flash memory, cache, static storage such as a magnetic or optical disk, or any other types of non-transitory computer-readable media or combinations thereof. Additionally, system 2200 includes a communication device 2220, such as a transceiver, to facilitate wired or wireless communication with external systems (e.g., autopilot, although this may be part of the same system in some embodiments).

Non-transitory computer-readable media may be any available media that can be accessed by processor(s) 2210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 2215 stores software modules that provide functionality when executed by processor(s) 2210. The modules include an operating system 2225 for system 2200. The modules further include a flight path planning and control module 2230 that is configured to determine a flight path for the rotorcraft and control flight. For instance, flight path planning and control module 2230 may be configured to perform any of the flight path planning and control operations discussed herein. System 2200 may include one or more additional functional modules 2235 that include additional functionality. In some embodiments, the additional functional modules may include a graphics overlay module that enables displaying of a virtual display overlay (i.e., an "electronic tunnel") via a display (not shown). Sensors 2240 provide information pertaining to the local environment, such as terrain and obstacles, around the rotorcraft.

One skilled in the art will appreciate that a "system" could be embodied as a computer, a server, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   determining a-priori, by a computing system, a plurality of three-dimensional voxels as cells of a rectangular grid, the cells having a predetermined length and width;
   calculating, by the computing system, a shortest safe path through the grid graph from a local start to a local goal defined as points on a nominal global path;
   performing, by the computing system, geometric smoothing on a basis line from the local start to the local goal to generate a smooth three-dimensional trajectory that can be followed by a given rotorcraft;
   performing dynamic smoothing on the three-dimensional trajectory, by the computing system, to provide a maximum possible speed profile over a path defined by the dynamic smoothing; and
   providing a three-dimensional path and speed profile, by the computing system, to be used by an autopilot to control the rotorcraft to fly along the defined path.

2. The computer-implemented method of claim 1, wherein the calculation of the shortest safe path comprises determining a corridor comprising a cross-section that takes into account dimensions and clearances for the rotorcraft.

3. The computer-implemented method of claim 2, wherein the calculation of the shortest path comprises determining horizontal plane legality of the nominal path, a right boundary, and a left boundary of the corridor.

4. The computer-implemented method of claim 2, wherein the calculation of the shortest safe path comprises determining vertical plane legality of the nominal path, an upper boundary, and a lower boundary of the corridor.

5. The computer-implemented method of claim 1, wherein the geometric smoothing comprises generating a smooth path in an x-y plane.

6. The computer-implemented method of claim 5, wherein an optimal path is approximated by longest legal straight lines connected by largest radius legal tangent arcs, each arc and line forming a horizontal geometrical unit (HGU).

7. The computer-implemented method of claim 1, wherein the geometric smoothing comprises generating a smooth path in an s-z plane.

8. The computer-implemented method of claim 7, wherein a quasi-optimal path is approximated by minimizing dives while following terrain, each arc and line in the smoothed path forming a vertical geometrical unit (VGU).

9. The computer-implemented method of claim 1, wherein the dynamic smoothing comprises determining HGU and VGU start and end points along s in an s-z plane and calculating maximum allowable entry and exit speeds for the start and end points.

10. The computer-implemented method of claim 9, wherein speed at s =0 is a current speed vector and speed at s =(clear path length) is taken as zero to ensure that the rotorcraft is capable of completing flare and reaching full hover at an end of the computed nominal path.

11. The computer-implemented method of claim 1, further comprising:
    when no safe path is found, enlarging a running grid, by the computing system, and searching for a safe path.

12. The computer-implemented method of claim 1, further comprising:
    when no safe path is found, initiating an ascent or ascending spiral of the rotorcraft, by the computing system, and performing a sensor sweep when an object is detected along the path that obstructs the sensors.

13. The computer-implemented method of claim 12, further comprising:
    detecting, by the computing system, a new path that is clear of obstacles; and
    initiating flight of the rotorcraft, by the computing system, along the newly detected path.

14. The computer-implemented, method of claim 1, further comprising:
    assigning a weight, by the computing system, to each of the cells, wherein the weight reflects overall line-of-sight (LOS) exposure to terrain surrounding each cell.

15. The computer-implemented method of claim 14, wherein the weight weight$_i$ is computed by visibility analysis of surrounding terrain, up to a nominal radius (range) $R_{nom}$, given by $$\text{weight}_i = \frac{n_{LOS}}{n_{TOT}}$$

where $n_{LOS}$ is a number of cells within $R_{nom}$ that have LOS with a center of a given cell at nominal altitude above the ground, and $n_{TOT}$ is a total number of cells within $R_{nom}$.

16. The computer-implemented method of claim 15, wherein determining the weight for a given cell further comprises subdividing a circular region of a maximum range d into equal sector such that each sector is at most one cell wide, defined by $$\theta_{sector} \cong \arctan\left(\frac{d}{R_{nom}}\right)$$

where visibility is computed along a centerline of each sector and each cell is tagged as being visible or hidden.

17. The computer-implemented method of claim 1, further comprising:
    receiving sensor input, by the computing system, regarding cell heights and weights; and when a cell's height changes by more than a predetermined percentage, recomputing the cell height and weight, by the computing system.

18. The computer-implemented method of claim 1, wherein the plurality of three-dimensional voxels further comprise cell weight and a pointer structure storing information on overhangs.

19. The computer-implemented method of claim 1, further comprising:
providing the three-dimensional path and speed profile, by the computing system, to a graphics processor to overlay with a camera view to provide visual cues to a pilot to follow a safe path.

20. A computing system, comprising:
memory storing executable computer program code; and
at least one processor configured to execute the computer program code, the at least one processor configured to:
determine a basis line through points at centers of 8-connected cells on a modified Dijkstra shortest path through a grid graph from a start point to an end point,
determine a polygonal line defining a minimum possible number of straight lines between points on the basis line, the polygonal line connecting the start point and the end point,
determine boundary lines parallel to the polygonal line defining a safe corridor, wherein the boundary lines of the corridor are determined by dimensions and clearances for a rotorcraft,
when a direction of a line segment of the polygonal line changes, determine a connecting arc for each change in direction to generate a horizontal path, and
provide a horizontal path to an autopilot based on the determinations.

21. The computing system of claim 20, wherein when a first line of the polygonal line is not aligned with a velocity vector of the rotorcraft, the at least one processor is further configured to:
designate an arc that is tangent to the velocity vector as a first horizontal geometrical unit; and
modify the first line of the polygonal line to be tangent to the arc.

22. The computing system of claim 20, wherein the connecting arc is greater than or equal to $$R_{min} = \frac{v_{tg}^2}{a_{max,LAT}}$$

where $R_{min}$ is a minimum radius, $a_{max,LAT}$ is a maximum lateral load factor, and $v_{tg}$ is a tangent velocity.

23. The computing system of claim 20, wherein the connecting arcs have a radius of half a size of the 8-connected cells.

24. The computing system of claim 20, wherein the computer program code is further configured to cause the at least one processor to determine legality of the polygonal line and the boundary lines.

25. The computing system of claim 20, wherein the autopilot is configured to control the rotorcraft based on the provided horizontal path.

26. A computer program embodied on a non-transitory computer-readable medium, the computer program configured to cause at least one processor to:
analyze a basis profile to determine regions of positive and negative average slopes;
eliminate dips that are less than a predetermined distance by filling these dips;
approximate a resultant path by straight lines in an s-z plane that do not exceed maximum predetermined slope limitations, do not violate clearance requirements from a terrain profile, and do not deviate more than a predetermined amount from the basis profile without dips;
connect the straight lines using arcs having maximum possible radii to minimize vertical accelerations while fulfilling vertical legality requirements to generate a vertical path; and
provide the vertical path to an autopilot of a rotorcraft to fly along the generated vertical path safely close to the terrain.

27. The computer program of claim 26, wherein the basis profile follows a smooth path in an x-y plane.

28. A computer-implemented method, comprising:
generating, by a computing system, a horizontal and vertical safe path for a rotorcraft;
determining, by the computing system, maximum speed limits for each arc and line segment of the horizontal and vertical paths;
generating, by the computing system, a dynamic smoothing profile for the rotorcraft from a starting position to an end position; and
providing the speed profile, by the computing system, to an autopilot of the rotorcraft to fly at speeds in accordance with the speed profile from the starting position to the end position.

29. The computer-implemented method of claim 28, wherein the generating of the horizontal and vertical safe path comprises generating a smooth path in an x-y plane and a s-z plane, respectively.

30. The computer-implemented method of claim 28, wherein the dynamic smoothing profile generation comprises determining horizontal safe path and vertical safe path start and end points along s in an s-z plane and calculating maximum allowable entry and exit speeds for the start and end points.

31. The computer-implemented method of claim 28, further comprising:
providing a three-dimensional path and the speed profile, by the computing system, to a graphics processor to overlay with a camera view to provide visual cues to a pilot to follow a safe path.

32. A computer-implemented method, comprising:
determining, by a computing system, a global nominal path;
calculating, by the computing system, a running grid with a predetermined size, wherein the running grid comprises a square terrain and weights database segment centered around a current position of a rotorcraft based on sensor information;
when a portion of the global nominal path that passes through the running grid is not possible to traverse or sub-optimal, determining a more optimal path through the running grid and modifying a three dimensional flight path to include the more optimal path through the running grid; and
providing the three dimensional flight path, by the computing system, to an autopilot to execute flight along the global nominal path.

33. The computer-implemented method of claim 32, further comprising:
initiating an ascent or ascending spiral of the rotorcraft, by the computing system, and performing a sensor sweep when the portion of the global nominal path is not possible to traverse.

34. The computer-implemented method of claim 32, wherein a size of each side of the running grid is twice a range of a sensor suite of the rotorcraft.

35. The computer-implemented method of claim 34, further comprising:
periodically recomputing the running grid, by the computing system, and modifying the three dimensional flight path when the corresponding portion of the global nominal path that passes through the running grid is not possible to traverse or sub-optimal.

36. The computer-implemented method of claim 32, further comprising:
providing the three-dimensional flight path and a speed profile, by the computing system, to a graphics processor to overlay with a camera view to provide visual cues to a pilot to follow a safe path.

37. A computer-implemented method, comprising:
determining a plurality of nodes, by a computing system, that are located at centers of terrain cells in a terrain map;
calculating, by the computing system, a cost of traversing a straight line arc from each cell to any of its respective 8-connected neighbors; and
generating, by the computing system, a minimum cost path through the terrain map based on the costs of the straight line arcs as a rough flight path footprint for a rotorcraft on an x-y plane.

38. The computer-implemented method of claim 37, wherein the cost of traversing each straight line arc is computed as $$\Delta C_{i \text{ to } j} = \frac{l_{ij}}{d}(w_i + w_j)$$

where d is a cell size, $w_i$ and $w_j$ are weights of cells i and j, respectively, and $l_{ij}$ is a distance between the terrain cells' surfaces.

39. The computer-implemented method of claim 38, wherein $l_{ij}$ is computed as $$l_{ij} = \sqrt{(h_i - h_j)^2 + (x_i - x_j)^2 + (y_i - y_j)^2}$$

where $(x_i, y_i)$ and $(x_j, y_j)$ are coordinates of cells i and j, respectively, and $h_i$ and $h_j$ are their respective heights.

40. The computer-implemented method of claim 38, wherein when a difference in heights between adjacent terrain cells is an order of magnitude or more smaller than terrain cell size, arcs are computed as $$\Delta C_{i \text{ to } j, diag} = \sqrt{2}(w_i + w_j)$$

$$\Delta C_{i \text{ to } j, 4C} = (w_i + w_j)$$

where $\Delta C_{i \text{ to } j, diag}$ represents a diagonal arc and $\Delta C_{i \text{ to } j, 4C}$ represents a 4-connected arc.

* * * * *